US010904474B2

(12) United States Patent
Han et al.

(10) Patent No.: US 10,904,474 B2
(45) Date of Patent: Jan. 26, 2021

(54) COMPREHENSIVE VIDEO COLLECTION AND STORAGE

(71) Applicant: DIGITAL ALLY, INC., Lenexa, KS (US)

(72) Inventors: Peng Han, Overland Park, KS (US); James W. Farnham, IV, Olathe, KS (US); Steven L. Phillips, Olathe, KS (US)

(73) Assignee: Digital Ally, Inc., Lenexa, KS (US)

( * ) Notice: Subject to any disclaimer, the term of this patent is extended or adjusted under 35 U.S.C. 154(b) by 0 days.

(21) Appl. No.: 15/423,803

(22) Filed: Feb. 3, 2017

(65) Prior Publication Data

US 2017/0230605 A1 Aug. 10, 2017

Related U.S. Application Data

(60) Provisional application No. 62/291,744, filed on Feb. 5, 2016, provisional application No. 62/328,784, filed on Apr. 28, 2016.

(51) Int. Cl.

*H04N 5/77* (2006.01)
*H04N 21/2743* (2011.01)
*H04N 7/18* (2006.01)
*G11B 27/19* (2006.01)

(52) U.S. Cl.

CPC ............... *H04N 5/77* (2013.01); *G11B 27/19* (2013.01); *H04N 7/185* (2013.01); *H04N 21/2743* (2013.01)

(58) Field of Classification Search

None

See application file for complete search history.

(56) References Cited

U.S. PATENT DOCUMENTS

| | | | |
|---|---|---|---|
| 4,409,670 | A | 10/1983 | Herndon et al. |
| 4,789,904 | A | 12/1988 | Peterson |
| 4,863,130 | A | 9/1989 | Marks, Jr. |
| 4,918,473 | A | 4/1990 | Blackshear |

(Continued)

FOREIGN PATENT DOCUMENTS

| | | | |
|---|---|---|---|
| DE | 102010019451 | A1 | 11/2011 |
| EP | 2479993 | A2 | 7/2012 |

(Continued)

OTHER PUBLICATIONS

Brick House Security Body Worn Cameras/Hidden Cameras/Covert Spy Cameras, http://www.brickhousesecurity.com/body-worn-covert-spy-cameras.html?sf=0#sortblock& CMP1D=PD_Google_%22body+camera%22&utm_source=google&utm_medium=cpc&utm_term=%22body+camera%22&mm_campaign=876a94ea5dd198a8c5dc3d1e67eccb34&keyword=%22.*

(Continued)

*Primary Examiner* — Heather R Jones
(74) *Attorney, Agent, or Firm* — Erise IP, P.A.

(57) ABSTRACT

A video collection system comprising a body-wearable video camera, a camera dock, and a video collection manager. The camera dock is configured to interface with the body-wearable video camera having a camera-memory element. The camera dock includes a dock-memory element configured to receive and store video data from the camera-memory element. The video collection manager is communicatively coupled with the camera dock. The camera dock sends at least a portion of the video data to the video collection manager.

20 Claims, 7 Drawing Sheets

(56) References Cited

U.S. PATENT DOCUMENTS

| | | | |
|---|---|---|---|
| 5,027,104 | A | 6/1991 | Reid |
| 5,096,287 | A | 3/1992 | Kaikinami et al. |
| 5,111,289 | A | 5/1992 | Lucas et al. |
| 5,289,321 | A | 2/1994 | Secor |
| 5,381,155 | A | 1/1995 | Gerber |
| 5,408,330 | A | 4/1995 | Squicciarii et al. |
| 5,446,659 | A | 8/1995 | Yamawaki |
| 5,453,939 | A | 9/1995 | Hoffman et al. |
| 5,473,729 | A | 12/1995 | Bryant et al. |
| 5,479,149 | A | 12/1995 | Pike |
| 5,497,419 | A | 3/1996 | Hill |
| 5,526,133 | A | 6/1996 | Paff |
| 5,585,798 | A | 12/1996 | Yoshioka et al. |
| 5,642,285 | A | 6/1997 | Woo et al. |
| 5,668,675 | A | 9/1997 | Fredricks |
| 5,689,442 | A | 11/1997 | Swanson et al. |
| 5,742,336 | A | 4/1998 | Lee |
| 5,752,632 | A | 5/1998 | Sanderson et al. |
| 5,798,458 | A | 8/1998 | Monroe |
| 5,815,093 | A | 9/1998 | Kikinis |
| 5,850,613 | A | 12/1998 | Bullecks |
| 5,878,283 | A | 3/1999 | House et al. |
| 5,886,739 | A | 3/1999 | Winningstad |
| 5,890,079 | A | 3/1999 | Levine |
| 5,926,210 | A | 7/1999 | Hackett et al. |
| 5,962,806 | A | 10/1999 | Coakley et al. |
| 5,978,017 | A | 11/1999 | Tino |
| 5,983,161 | A | 11/1999 | Lemelson et al. |
| 5,996,023 | A | 11/1999 | Winter et al. |
| 6,008,841 | A | 12/1999 | Charlson |
| 6,028,528 | A | 2/2000 | Lorenzetti et al. |
| 6,052,068 | A | 4/2000 | Price R-W et al. |
| 6,097,429 | A | 8/2000 | Seeley et al. |
| 6,100,806 | A | 8/2000 | Gaukel |
| 6,121,881 | A | 9/2000 | Bieback et al. |
| 6,141,609 | A | 10/2000 | Herdeg et al. |
| 6,141,611 | A | 10/2000 | Mackey et al. |
| 6,163,338 | A | 12/2000 | Johnson et al. |
| 6,175,300 | B1 | 1/2001 | Kendrick |
| 6,298,290 | B1 | 10/2001 | Abe et al. |
| 6,310,541 | B1 | 10/2001 | Atkins |
| 6,314,364 | B1 | 11/2001 | Nakamura |
| 6,324,053 | B1 | 11/2001 | Kamijo |
| 6,326,900 | B2 | 12/2001 | Deline et al. |
| 6,333,694 | B2 | 12/2001 | Pierce et al. |
| 6,333,759 | B1 | 12/2001 | Mazzilli |
| 6,370,475 | B1 | 4/2002 | Breed et al. |
| RE37,709 | E | 5/2002 | Dukek |
| 6,389,340 | B1 | 5/2002 | Rayner |
| 6,396,403 | B1 | 5/2002 | Haner |
| 6,405,112 | B1 | 6/2002 | Rayner |
| 6,449,540 | B1 | 9/2002 | Rayner |
| 6,452,572 | B1 | 9/2002 | Fan et al. |
| 6,490,409 | B1 | 12/2002 | Walker |
| 6,518,881 | B2 | 2/2003 | Monroe |
| 6,525,672 | B2 | 2/2003 | Chainer et al. |
| 6,546,119 | B2 | 4/2003 | Ciolli et al. |
| 6,560,463 | B1 | 5/2003 | Santhoff |
| 6,563,532 | B1 | 5/2003 | Strub et al. |
| 6,591,242 | B1 | 7/2003 | Karp et al. |
| 6,681,195 | B1 | 1/2004 | Poland et al. |
| 6,690,268 | B2 | 2/2004 | Schofield et al. |
| 6,697,103 | B1 | 2/2004 | Fernandez et al. |
| 6,718,239 | B2 | 4/2004 | Rayer |
| 6,727,816 | B1 | 4/2004 | Helgeson |
| 6,748,792 | B1 | 6/2004 | Freund et al. |
| 6,823,621 | B2 | 11/2004 | Gotfried |
| 6,831,556 | B1 | 12/2004 | Boykin |
| 6,856,873 | B2 | 2/2005 | Breed et al. |
| 6,883,694 | B2 | 4/2005 | Abelow |
| 6,970,183 | B1 | 11/2005 | Monroe |
| 7,012,632 | B2 | 3/2006 | Freeman et al. |
| 7,034,683 | B2 | 4/2006 | Ghazarian |
| D520,738 | S | 5/2006 | Tarantino |
| 7,038,590 | B2 | 5/2006 | Hoffman et al. |
| 7,088,387 | B1 | 8/2006 | Freeman et al. |
| 7,119,832 | B2 | 10/2006 | Blanco et al. |
| 7,126,472 | B2 | 10/2006 | Kraus et al. |
| 7,147,155 | B2 | 12/2006 | Weekes |
| 7,180,407 | B1 | 2/2007 | Guo et al. |
| 7,190,822 | B2 | 3/2007 | Gammenthaler |
| 7,363,742 | B2 | 4/2008 | Nerheim |
| 7,371,021 | B2 | 5/2008 | Ross et al. |
| 7,421,024 | B2 | 9/2008 | Castillo |
| 7,436,143 | B2 | 10/2008 | Lakshmanan et al. |
| 7,436,955 | B2 | 10/2008 | Yan et al. |
| 7,448,996 | B2 | 11/2008 | Khanuja et al. |
| 7,456,875 | B2 | 11/2008 | Kashiwa |
| 7,496,140 | B2 | 2/2009 | Winningstad et al. |
| 7,500,794 | B1 | 3/2009 | Clark |
| 7,508,941 | B1 | 3/2009 | O'Toole, Jr. et al. |
| 7,536,457 | B2 | 5/2009 | Miller |
| 7,539,533 | B2 | 5/2009 | Tran |
| 7,561,037 | B1 | 7/2009 | Monroe |
| 7,594,305 | B2 | 9/2009 | Moore |
| 7,602,301 | B1 | 10/2009 | Stirling et al. |
| 7,656,439 | B1 | 2/2010 | Manico et al. |
| 7,659,827 | B2 | 2/2010 | Gunderson et al. |
| 7,680,947 | B2 | 3/2010 | Nicholl et al. |
| 7,697,035 | B1 | 4/2010 | Suber, III et al. |
| 7,804,426 | B2 | 9/2010 | Etcheson |
| 7,806,525 | B2 | 10/2010 | Howell et al. |
| 7,853,944 | B2 | 12/2010 | Choe |
| 7,944,676 | B2 | 5/2011 | Smith et al. |
| 8,077,029 | B1 | 12/2011 | Daniel et al. |
| 8,121,306 | B2 | 2/2012 | Cilia et al. |
| 8,175,314 | B1 | 5/2012 | Webster |
| 8,269,617 | B2 | 9/2012 | Cook et al. |
| 8,314,708 | B2 | 11/2012 | Gunderson et al. |
| 8,350,907 | B1 | 1/2013 | Blanco et al. |
| 8,356,438 | B2 | 1/2013 | Brundula et al. |
| 8,373,567 | B2 | 2/2013 | Denson |
| 8,373,797 | B2 | 2/2013 | Ishii et al. |
| 8,384,539 | B2 | 2/2013 | Denny et al. |
| 8,446,469 | B2 | 5/2013 | Blanco et al. |
| 8,456,293 | B1 | 6/2013 | Trundle et al. |
| 8,508,353 | B2 | 8/2013 | Cook et al. |
| 8,594,485 | B2 | 11/2013 | Brundula |
| 8,606,492 | B1 | 12/2013 | Botnen |
| 8,676,428 | B2 | 3/2014 | Richardson et al. |
| 8,690,365 | B1 | 4/2014 | Williams |
| 8,707,758 | B2 | 4/2014 | Keays |
| 8,725,462 | B2 | 5/2014 | Jain et al. |
| 8,744,642 | B2 | 6/2014 | Nemat-Nasser et al. |
| 8,780,205 | B2 | 7/2014 | Boutell et al. |
| 8,781,292 | B1 | 7/2014 | Ross et al. |
| 8,805,431 | B2 | 8/2014 | Vasavada et al. |
| 8,849,501 | B2 | 9/2014 | Cook et al. |
| 8,854,199 | B2 | 10/2014 | Cook et al. |
| 8,887,208 | B1 | 11/2014 | Merrit et al. |
| 8,930,072 | B1 | 1/2015 | Lambert et al. |
| 8,989,914 | B1 | 3/2015 | Nemat-Nasser et al. |
| 8,996,234 | B1 | 3/2015 | Tamari et al. |
| 9,003,474 | B1 | 4/2015 | Smith |
| 9,058,499 | B1 | 6/2015 | Smith |
| 9,122,082 | B2 | 9/2015 | Abreau |
| 9,164,543 | B2 | 10/2015 | Minn et al. |
| 9,253,452 | B2 | 2/2016 | Ross et al. |
| 9,591,255 | B2 | 3/2017 | Sakiewica et al. |
| 2002/0013517 | A1 | 1/2002 | West et al. |
| 2002/0019696 | A1 | 2/2002 | Kruse |
| 2002/0032510 | A1 | 3/2002 | Tumball et al. |
| 2002/0044065 | A1 | 4/2002 | Quist et al. |
| 2002/0049881 | A1 | 4/2002 | Sugimura |
| 2002/0084130 | A1 | 7/2002 | Der Gazarian et al. |
| 2002/0131768 | A1 | 9/2002 | Gammenthaler |
| 2002/0135336 | A1 | 9/2002 | Zhou et al. |
| 2002/0159434 | A1 | 10/2002 | Gosior et al. |
| 2002/0191952 | A1 | 12/2002 | Fiore et al. |
| 2003/0040917 | A1 | 2/2003 | Fiedler |
| 2003/0080713 | A1 | 5/2003 | Kirmuss |
| 2003/0080878 | A1 | 5/2003 | Kirmuss |
| 2003/0081121 | A1 | 5/2003 | Kirmuss |
| 2003/0081934 | A1 | 5/2003 | Kirmuss |

(56) References Cited

U.S. PATENT DOCUMENTS

| | | | |
|---|---|---|---|
| 2003/0081935 | A1 | 5/2003 | Kirmuss |
| 2003/0081942 | A1 | 5/2003 | Melnyk et al. |
| 2003/0095688 | A1 | 5/2003 | Kirmuss |
| 2003/0106917 | A1 | 6/2003 | Shelter et al. |
| 2003/0133018 | A1 | 7/2003 | Ziemkowski |
| 2003/0151510 | A1 | 8/2003 | Quintana et al. |
| 2003/0184674 | A1 | 10/2003 | Manico et al. |
| 2003/0185417 | A1 | 10/2003 | Alattar et al. |
| 2003/0215010 | A1 | 11/2003 | Kashiwa |
| 2003/0215114 | A1 | 11/2003 | Kyle |
| 2003/0222982 | A1 | 12/2003 | Hamdan et al. |
| 2004/0008255 | A1 | 1/2004 | Lewellen |
| 2004/0043765 | A1 | 3/2004 | Tolhurst |
| 2004/0143373 | A1 | 6/2004 | Ennis |
| 2004/0145457 | A1 | 7/2004 | Schofield et al. |
| 2004/0150717 | A1 | 8/2004 | Page et al. |
| 2004/0168002 | A1 | 8/2004 | Accarie et al. |
| 2004/0199785 | A1 | 10/2004 | Pederson |
| 2004/0223054 | A1 | 11/2004 | Rotholtz |
| 2004/0243734 | A1 | 12/2004 | Kitagawa et al. |
| 2004/0267419 | A1 | 12/2004 | Jing |
| 2005/0030151 | A1 | 2/2005 | Singh |
| 2005/0046583 | A1 | 3/2005 | Richards |
| 2005/0050266 | A1 | 3/2005 | Haas et al. |
| 2005/0068169 | A1 | 3/2005 | Copley et al. |
| 2005/0068417 | A1 | 3/2005 | Kreiner et al. |
| 2005/0083404 | A1 | 4/2005 | Pierce et al. |
| 2005/0094966 | A1 | 5/2005 | Elberbaum |
| 2005/0100329 | A1 | 5/2005 | Lao et al. |
| 2005/0101334 | A1 | 5/2005 | Brown et al. |
| 2005/0134966 | A1 | 5/2005 | Burgner |
| 2005/0132200 | A1 | 6/2005 | Jaffe et al. |
| 2005/0151852 | A1 | 7/2005 | Jomppanen |
| 2005/0035161 | A1 | 8/2005 | Shioda |
| 2005/0185438 | A1 | 8/2005 | Ching |
| 2005/0206532 | A1 | 9/2005 | Lock |
| 2005/0206741 | A1 | 9/2005 | Raber |
| 2005/0228234 | A1 | 10/2005 | Yang |
| 2005/0232469 | A1 | 10/2005 | Schofield et al. |
| 2005/0243171 | A1 | 11/2005 | Ross, Sr. et al. |
| 2005/0258942 | A1 | 11/2005 | Manasseh et al. |
| 2006/0009238 | A1 | 1/2006 | Stanco et al. |
| 2006/0028811 | A1 | 2/2006 | Ross, Jr. et al. |
| 2006/0055786 | A1 | 3/2006 | Olilla |
| 2006/0158968 | A1 | 7/2006 | Vanman et al. |
| 2006/0164220 | A1 | 7/2006 | Harter, Jr. et al. |
| 2006/0164534 | A1 | 7/2006 | Robinson et al. |
| 2006/0170770 | A1 | 8/2006 | MacCarthy |
| 2006/0176149 | A1 | 8/2006 | Douglas |
| 2006/0183505 | A1 | 8/2006 | Willrich |
| 2006/0193749 | A1 | 8/2006 | Ghazarian et al. |
| 2006/0203090 | A1 | 9/2006 | Wang et al. |
| 2006/0220826 | A1 | 10/2006 | Rast |
| 2006/0225253 | A1 | 10/2006 | Bates |
| 2006/0244601 | A1 | 11/2006 | Nishimura |
| 2006/0256822 | A1 | 11/2006 | Kwong et al. |
| 2006/0270465 | A1 | 11/2006 | Lee et al. |
| 2006/0271287 | A1 | 11/2006 | Gold et al. |
| 2006/0274166 | A1 | 12/2006 | Lee et al. |
| 2006/0274828 | A1 | 12/2006 | Siemens et al. |
| 2006/0276200 | A1 | 12/2006 | Radhakrishnan et al. |
| 2006/0282021 | A1 | 12/2006 | DeVaul et al. |
| 2006/0287821 | A1 | 12/2006 | Lin |
| 2006/0293571 | A1 | 12/2006 | Bao et al. |
| 2007/0021134 | A1 | 1/2007 | Liou |
| 2007/0064108 | A1 | 3/2007 | Haler |
| 2007/0067079 | A1 | 3/2007 | Kosugi |
| 2007/0091557 | A1 | 4/2007 | Kim et al. |
| 2007/0102508 | A1 | 5/2007 | Mcintosh |
| 2007/0117083 | A1 | 5/2007 | Winneg et al. |
| 2007/0132567 | A1 | 6/2007 | Schofield et al. |
| 2007/0152811 | A1 | 7/2007 | Anderson |
| 2007/0172053 | A1 | 7/2007 | Poirier |
| 2007/0177023 | A1 | 8/2007 | Beuhler et al. |
| 2007/0199076 | A1 | 8/2007 | Rensin et al. |
| 2007/0229350 | A1 | 10/2007 | Scalisi et al. |
| 2007/0257781 | A1 | 11/2007 | Denson |
| 2007/0257782 | A1 | 11/2007 | Etcheson |
| 2007/0257804 | A1 | 11/2007 | Gunderson et al. |
| 2007/0257815 | A1 | 11/2007 | Gunderson et al. |
| 2007/0260361 | A1 | 11/2007 | Etcheson |
| 2007/0268158 | A1 | 11/2007 | Gunderson et al. |
| 2007/0271105 | A1 | 11/2007 | Gunderson et al. |
| 2007/0274705 | A1 | 11/2007 | Kashiwa |
| 2007/0277352 | A1 | 12/2007 | Maron et al. |
| 2007/0285222 | A1 | 12/2007 | Zadnikar |
| 2007/0287425 | A1 | 12/2007 | Bates |
| 2007/0297320 | A1 | 12/2007 | Brummette et al. |
| 2008/0001735 | A1 | 1/2008 | Tran |
| 2008/0002031 | A1 | 1/2008 | Cana et al. |
| 2008/0002599 | A1 | 2/2008 | Denny et al. |
| 2008/0030580 | A1 | 2/2008 | Kashhiawa et al. |
| 2008/0042825 | A1 | 2/2008 | Denny et al. |
| 2008/0043736 | A1 | 2/2008 | Stanley |
| 2008/0049830 | A1 | 2/2008 | Richardson |
| 2008/0063252 | A1 | 3/2008 | Dobbs et al. |
| 2008/0084473 | A1 | 4/2008 | Romanowich |
| 2008/0100705 | A1 | 5/2008 | Kister et al. |
| 2008/0122603 | A1 | 5/2008 | Piante et al. |
| 2008/0129518 | A1 | 6/2008 | Carlton-Foss |
| 2008/0143481 | A1 | 6/2008 | Abraham et al. |
| 2008/0144705 | A1 | 6/2008 | Rackin et al. |
| 2008/0169929 | A1 | 7/2008 | Albertson et al. |
| 2008/0170130 | A1 | 7/2008 | Ollila et al. |
| 2008/0211906 | A1 | 9/2008 | Lovric |
| 2008/0222849 | A1 | 9/2008 | Lavoie |
| 2008/0239064 | A1 | 10/2008 | Iwasaki |
| 2008/0246656 | A1 | 10/2008 | Ghazarian |
| 2008/0266118 | A1 | 10/2008 | Pierson et al. |
| 2008/0307435 | A1 | 12/2008 | Rehman |
| 2008/0316314 | A1 | 12/2008 | Bedell et al. |
| 2009/0002491 | A1 | 1/2009 | Haler |
| 2009/0002556 | A1 | 1/2009 | Manapragada et al. |
| 2009/0027499 | A1 | 1/2009 | Nicholl |
| 2009/0052685 | A1 | 2/2009 | Cilia et al. |
| 2009/0070820 | A1 | 3/2009 | Li |
| 2009/0122142 | A1 | 5/2009 | Shapley |
| 2009/0135007 | A1 | 5/2009 | Donovan et al. |
| 2009/0169068 | A1 | 7/2009 | Okamoto |
| 2009/0189981 | A1 | 7/2009 | Siann et al. |
| 2009/0195686 | A1 | 8/2009 | Shintani |
| 2009/0207252 | A1 | 8/2009 | Raghunath |
| 2009/0213204 | A1 | 8/2009 | Wong |
| 2009/0243794 | A1 | 10/2009 | Morrow |
| 2009/0251545 | A1 | 10/2009 | Shekarri et al. |
| 2009/0252486 | A1 | 10/2009 | Ross, Jr. et al. |
| 2009/0276708 | A1 | 11/2009 | Smith et al. |
| 2009/0294538 | A1 | 12/2009 | Wihlborg et al. |
| 2009/0324203 | A1 | 12/2009 | Wiklof |
| 2010/0045798 | A1 | 2/2010 | Sugimoto et al. |
| 2010/0050734 | A1 | 3/2010 | Chou |
| 2010/0060747 | A1 | 3/2010 | Woodman |
| 2010/0097221 | A1 | 4/2010 | Kreiner et al. |
| 2010/0106707 | A1 | 4/2010 | Brown et al. |
| 2010/0118147 | A1 | 5/2010 | Dorneich et al. |
| 2010/0122435 | A1 | 5/2010 | Markham |
| 2010/0123779 | A1 | 5/2010 | Snyder et al. |
| 2010/0177193 | A1 | 7/2010 | Flores |
| 2010/0177891 | A1 | 7/2010 | Keidar et al. |
| 2010/0188201 | A1 | 7/2010 | Cook et al. |
| 2010/0191411 | A1 | 7/2010 | Cook et al. |
| 2010/0194885 | A1 | 8/2010 | Plaster |
| 2010/0217836 | A1* | 8/2010 | Rofougaran ............ H04M 1/04 709/218 |
| 2010/0238009 | A1 | 9/2010 | Cook et al. |
| 2010/0238262 | A1 | 9/2010 | Kurtz et al. |
| 2010/0242076 | A1 | 9/2010 | Potesta et al. |
| 2010/0265331 | A1 | 10/2010 | Tanaka |
| 2010/0274816 | A1 | 10/2010 | Guzik |
| 2010/0287473 | A1 | 11/2010 | Recesso et al. |
| 2011/0006151 | A1 | 1/2011 | Beard |
| 2011/0018998 | A1 | 1/2011 | Guzik |
| 2011/0050904 | A1 | 3/2011 | Anderson |
| 2011/0069151 | A1 | 3/2011 | Orimoto |

(56) References Cited

U.S. PATENT DOCUMENTS

| | | | |
|---|---|---|---|
| 2011/0084820 A1 | 4/2011 | Walter et al. | |
| 2011/0094003 A1 | 4/2011 | Spiewak et al. | |
| 2011/0098924 A1 | 4/2011 | Baladeta et al. | |
| 2011/0129151 A1 | 6/2011 | Saito et al. | |
| 2011/0157759 A1* | 6/2011 | Smith | H05C 1/06 361/232 |
| 2011/0261176 A1 | 10/2011 | Monaghan, Sr. et al. | |
| 2011/0281547 A1 | 11/2011 | Cordero | |
| 2011/0301971 A1 | 12/2011 | Roesch et al. | |
| 2011/0314401 A1 | 12/2011 | Salisbury et al. | |
| 2012/0038689 A1 | 2/2012 | Ishii | |
| 2012/0056722 A1 | 3/2012 | Kawaguchi | |
| 2012/0063736 A1 | 3/2012 | Simmons et al. | |
| 2012/0120258 A1 | 5/2012 | Boutell et al. | |
| 2012/0162436 A1 | 6/2012 | Cordell et al. | |
| 2012/0188345 A1 | 7/2012 | Salow | |
| 2012/0189286 A1 | 7/2012 | Takayama et al. | |
| 2012/0195574 A1 | 8/2012 | Wallace | |
| 2012/0230540 A1 | 9/2012 | Calman et al. | |
| 2012/0257320 A1 | 10/2012 | Brundula et al. | |
| 2012/0268259 A1 | 10/2012 | Igel et al. | |
| 2012/0276954 A1 | 11/2012 | Kowalsky | |
| 2013/0021153 A1 | 1/2013 | Keays | |
| 2013/0033610 A1 | 2/2013 | Osborn | |
| 2013/0035602 A1 | 2/2013 | Gemer | |
| 2013/0080836 A1 | 3/2013 | Stergiou et al. | |
| 2013/0096731 A1 | 4/2013 | Tamari et al. | |
| 2013/0148295 A1 | 6/2013 | Minn et al. | |
| 2013/0222640 A1 | 8/2013 | Baek et al. | |
| 2013/0225309 A1 | 8/2013 | Bentley et al. | |
| 2013/0285232 A1 | 10/2013 | Sheth | |
| 2013/0290018 A1* | 10/2013 | Anderson | G06Q 10/10 705/2 |
| 2013/0300563 A1 | 11/2013 | Glaze | |
| 2013/0343571 A1 | 12/2013 | Lee | |
| 2014/0037262 A1 | 2/2014 | Sako | |
| 2014/0049636 A1 | 2/2014 | O'Donnell et al. | |
| 2014/0092299 A1 | 4/2014 | Phillips et al. | |
| 2014/0094992 A1 | 4/2014 | Lambert et al. | |
| 2014/0098453 A1 | 4/2014 | Brundula et al. | |
| 2014/0140575 A1 | 5/2014 | Wolf | |
| 2014/0170602 A1 | 6/2014 | Reed | |
| 2014/0192194 A1 | 7/2014 | Bedell et al. | |
| 2014/0195105 A1 | 7/2014 | Lambert et al. | |
| 2014/0195272 A1 | 7/2014 | Sadiq et al. | |
| 2014/0210625 A1 | 7/2014 | Nemat-Nasser | |
| 2014/0218544 A1 | 8/2014 | Senot et al. | |
| 2014/0227671 A1 | 8/2014 | Olmstead et al. | |
| 2014/0311215 A1 | 10/2014 | Keays et al. | |
| 2014/0355951 A1 | 12/2014 | Tabak | |
| 2015/0050003 A1 | 2/2015 | Ross et al. | |
| 2015/0050345 A1 | 2/2015 | Smyth et al. | |
| 2015/0051502 A1 | 2/2015 | Ross | |
| 2015/0053776 A1 | 3/2015 | Rose et al. | |
| 2015/0078727 A1 | 3/2015 | Ross et al. | |
| 2015/0088335 A1 | 3/2015 | Lambert et al. | |
| 2015/0103246 A1 | 4/2015 | Phillips et al. | |
| 2015/0229630 A1 | 8/2015 | Smith | |
| 2015/0317368 A1 | 11/2015 | Rhoads et al. | |
| 2015/0332424 A1 | 11/2015 | Kane et al. | |
| 2015/0358549 A1 | 12/2015 | Cho et al. | |
| 2016/0042767 A1 | 2/2016 | Araya et al. | |
| 2016/0064036 A1* | 3/2016 | Chen | G06F 16/43 386/241 |
| 2016/0104508 A1 | 4/2016 | Chee et al. | |
| 2016/0127695 A1 | 5/2016 | Zhang et al. | |
| 2016/0165192 A1 | 6/2016 | Saatchi et al. | |
| 2016/0364621 A1 | 12/2016 | Hill et al. | |
| 2017/0018047 A1* | 1/2017 | Hanchett | G06Q 50/265 |
| 2017/0070659 A1 | 3/2017 | Kievsky et al. | |
| 2017/0195635 A1 | 7/2017 | Yokomitsu et al. | |
| 2017/0200476 A1* | 7/2017 | Chen | G11B 27/10 |
| 2017/0230605 A1 | 8/2017 | Han et al. | |
| 2017/0237950 A1 | 8/2017 | Araya et al. | |
| 2017/0244884 A1 | 8/2017 | Burtey et al. | |
| 2017/0277700 A1 | 9/2017 | Davis et al. | |
| 2017/0287523 A1 | 10/2017 | Hodulik et al. | |
| 2018/0023910 A1 | 1/2018 | Kramer | |
| 2018/0050800 A1 | 2/2018 | Boykin et al. | |

FOREIGN PATENT DOCUMENTS

| | | |
|---|---|---|
| GB | 2273624 | 6/1994 |
| GB | 2320389 | 5/1998 |
| GB | 2343252 | 5/2000 |
| GB | 2351055 | 12/2000 |
| GB | 2417151 | 2/2006 |
| GB | 2425427 | 10/2006 |
| GB | 2455885 | 7/2009 |
| GB | 2485804 A | 5/2012 |
| IE | 20090923 A1 | 9/2010 |
| JP | 294188 | 9/1993 |
| JP | 153298 | 6/1996 |
| JP | 198858 | 7/1997 |
| JP | 10076880 A | 3/1998 |
| JP | 210395 | 7/1998 |
| JP | 2000137263 A | 5/2000 |
| JP | 2005119631 A | 5/2005 |
| KR | 20-0236817 | 8/2001 |
| KR | 1050897 | 7/2011 |
| RU | 2383915 C2 | 3/2010 |
| RU | 107851 U1 | 8/2011 |
| RU | 124780 U1 | 2/2013 |
| WO | 9005076 | 5/1990 |
| WO | 9738526 | 10/1997 |
| WO | 9831146 | 7/1998 |
| WO | 9948308 | 9/1999 |
| WO | 0039556 | 7/2000 |
| WO | 0051360 | 8/2000 |
| WO | 0123214 A1 | 4/2001 |
| WO | 0249881 | 6/2002 |
| WO | 02095757 | 11/2002 |
| WO | 03049446 | 6/2003 |
| WO | 2004036926 A2 | 4/2004 |
| WO | 2009013526 A1 | 1/2009 |
| WO | 201001180 A1 | 1/2011 |
| WO | 2012037139 A2 | 3/2012 |
| WO | 2012120083 A1 | 9/2012 |
| WO | 2014000161 A1 | 1/2014 |
| WO | 2014052898 A1 | 4/2014 |

OTHER PUBLICATIONS (Continued from U above): body+camera%22&utm_source=google&utm_medium=cpc&utm_campaign=Cameras+-+Body+Worn+Cameras&c1=323-29840300-t14536730-10363-12601-3009263&gclid=CPiBq7mliq8CFSWFQAod GlsW8g&ad=7592872943, Sep. 26, 2013, Date Posted: Unknown, pp. 1-2.*

Ecplaza HY-001HD law enforcement DVR, http://fireeye.en.ecplaza.net/law-enforcement-dvr--238185-1619696.html, Sep. 26, 2013, Date Posted: Unknown, pp. 1-3.

Edesix VideoBadge, http://www.edesix.com/edesix-products, Sep. 26, 2013, Date Posted: Unknown, pp. 1-3.

GoPro Official Website: The World's Most Versatile Camera, http://gopro.com/products/?gclid=CKqHv9jT4rkCFWZk7AodyiAAaQ, Sep. 23, 2013, Date Posted: Unknown, pp. 4-9.

Isaw Advance Hull HD EXtreme, www.isawcam.co.kr, Sep. 26, 2013, Date Posted: Unknown, p. 1.

Kustom Signals VieVu, http://www.kustomsignals.com/index.php/mvideo/vievu, Sep. 26, 2013, Date Posted: Unknown, pp. 1-4.

Lea-Aid Scorpion Micro Recorder Patrol kit,http://www.leacorp.com/products/SCORPION-Micro-Recorder-Patrol-kit.html, Sep. 26, 2013, Date Posted: Unknown, pp. 1-2.

Looxcie Wearable & mountable streaming video cams, http://www.looxcie.com/overview?gclid=CPbDyv6piq8CFWeFQAodlhXC-w, Sep. 26, 2013, Date Posted: Unknown, pp. 1-4.

Midland XTC HD Video Camera, http://midlandradio.com/Company/xtc100-signup, Sep. 26, 2013, Date Posted: Unknown, pp. 1-3.

Panasonic Handheld AVCCAM HD Recorder/Player, http://www.panasonic.com/business/provideo/ag-hmr10.asp, Sep. 26, 2013, Date Posted: Unknown, pp. 1-2.

(56) References Cited

OTHER PUBLICATIONS

Notification of Transmittal of the International Search Report and the Written Opinion of the International Search Authority, or the Declaration dated Jan. 30, 2014, International Application No. PCT/US2013/062415; International Filing date Sep. 27, 2013, Applicant: Digital Ally, Inc.
Point of View Cameras Military & Police, http://pointofviewcameras.com/military-police, Sep. 26, 2013, Date Posted: Unknown, pp. 1-2.
POV.HD System Digital Video Camera, http://www.vio-pov.com/index.php, Sep. 26, 2013, Date Posted: Unknown, pp. 1-3.
Invalidity Chart for International Publication No. WO2014/000161 Oct. 31, 2017.
PCT Patent Application PCT/US17/16383 International Search Report and Written Opinion dated May 4, 2017.
SIV Security in Vehicle Driving Partner, http://www.siv.co.kr/, Sep. 26, 2013, Date Posted: Unknown, p. 1.
Spy Chest Mini Spy Camera / Self Contained Mini camcorder / Audio & Video Recorder, http://www.spytechs.com/spy_cameras/mini-spy-camera.htm, Sep. 26, 2013, Date Posted: Unknown, pp. 1-3.
Stalker VUE Law Enforcement Grade Body Worn Video Camera/Recorder, http://www.stalkerradar.com/law_vue.shtml, Sep. 26, 2013, Date Posted: Unknown, pp. 1-2.
SUV Cam, http://www.elmo.co.jp/suv-cam/en/product/index.html, Sep. 26, 2013, Date Posted: Unknown, p. 1.
Taser Axon Body on Officer Video/Police Body Camera, http://www.taser.com/products/on-officer-video/axon-body-on-officer-video, Sep. 23, 2013, Date Posted: Unknown, pp. 1-8.
Taser Axon Flex On-Officer Video/Police Video Camera, http://www.taser.com/products/on-officer-video/taser-axon, Sep. 26, 2013, Date Posted: Unknown, pp. 1-8.
Taser Cam Law Enforcement Audio/Video Recorder (gun mounted), http://www.taser.com/products/on-officer-video/taser-cam, Sep. 26, 2013, Date Posted: Unknown, pp. 1-3.
Tide Leader police body worn camera, http://tideleader.en.gongchang.com/product/14899076, Sep. 26, 2013, Date Posted: Unknown, pp. 1-3.
UCorder Pockito Wearable Mini Pocket Camcorder, http://www.ucorder.com/, Sep. 26, 2013, Date Posted: Unknown, p. 1.
Veho MUVI HD, http://veho-uk.fastnet.co.uk/main/shop.aspx?category=CAMMUVIHD, Sep. 26, 2013, Date Posted: Unknown, pp. 1-5.
Veho MUVI portable wireless speaker with dock, http://veho-uk.fastnet.co.uk/main/shop.aspx?category=camcorder, Sep. 26, 2013, Date Posted: Unknown, p. 1.
Vidmic Officer Worn Video & Radio Accessories, http://www.vidmic.com/, Sep. 26, 2013, Date Posted: Unknown, p. 1.
VIEVU Products, http://www.vievu.com/vievu-products/vievu-squared/, Sep. 25, 2013, Date Posted: Unknown, pp. 1-2.
WatchGuard CopVu Wearable Video Camera System, http://watchguardvideo.com/copvu/overview, Sep. 26, 2013, Date Posted: Unknown, pp. 1-2.
Witness Cam headset, http://www.secgru.com/DVR-Witness-Cam-Headset-Video-Recorder-SG-DVR-1-COP.html, Sep. 26, 2013, Date Posted: Unknown, pp. 1-2.
WolfCom 3rd Eye, X1 A/V Recorder for Police and Military, http://wolfcomusa.com/Products/Products.html, Sep. 26, 2013, Date Posted: Unknown, pp. 1-3.
Notification of Transmittal of the International Search Report and the Written Opinion of the International Search Authority, or the Declaration dated Jan. 14, 2016, International Application No. PCT/US2015/056039; International Filing date Oct. 16, 2015, Applicant: Digital Ally, Inc.
U.S. Appl. No. 13/959,142 Final Office Action dated Jul. 20, 2016.
U.S. Appl. No. 13/959,142 Office Action dated Nov. 3, 2015.
*Digital Ally, Inc.* vs. *Taser International, Inc.*, Case No. 2:16-cv-020232 (CJM/TJ); US D. Kan, Complaint for Patent Infringement, Jan. 14, 2016.
*Digital Ally, Inc.* vs. *Enforcement video LLC d/b/a Watchguard Video.*, Case No. 2:16-cv-02349 (CJM/TJ); US D. Kan, Complaint for Patent Infringement, May 27, 2016.
International Association of Chiefs of Police Digital Video System Minimum Specifications; Nov. 21, 2008.
Petition for Inter Partes Review No. 2017-00375, *Taser International, Inc.* v. *Digital Ally, Inc.*, filed Dec. 1, 2016.
Petition for Inter Partes Review No. 2017-00376, *Taser International, Inc.* v. *Digital Ally, Inc.*, filed Dec. 1, 2016.
Petition for Inter Partes Review No. 2017-00515, *Taser International, Inc.* v. *Digital Ally, Inc.*, filed Jan. 11, 2017.
Petition for Inter Partes Review No. 2017-00775, *Taser International, Inc.* v. *Digital Ally Inc.*, filed Jan. 25, 2017.
PCT Patent Application PCT/US16/34345 International Search Report and Written Opinion dated Dec. 29, 2016.
State of Utah Invitation to Bid State Cooperative Contract; Vendor: Kustom Signals Inc., Contract No. MA1991, Apr. 25, 2008.
Dyna Spy Inc. hidden cameras, https://www.dynaspy.com/hidden-cameras/spy-cameras/body-worn-wearable-spy-cameras, Sep. 26, 2013, Date Posted: Unknown, pp. 1-3.
U.S. Appl. No. 15/011,132 Office Action dated Apr. 18, 2016, 19 pages.
Zepcam Wearable Video Technology, http://www.zepcam.com/product.aspx, Sep. 26, 2013, Date Posted: Unknown, pp. 1-2.
Invalidity Chart for International Publication No. WO2014/000161 Oct. 31, 2017 (Resubmitted).
Petition for Post Grant Review No. PGR2018-00052, *Axon Enterprise, Inc.* v. *Digital Ally, Inc.*, filed Mar. 19, 2018.
MPEG-4 Coding of Moving Pictures and Audio ISO/IEC JTC1/SC29/WG11 N4668 dated Mar. 2002.
Automation Systems Article, Know-How Bank Co. Ltd. Takes Leap Forward as a Company Specializing in R&D and Technology Consulting, published Jan. 2005.
Car Rear View Camera—Multimedia Rear View Mirror—4' LCD color monitor, Retrieved from the Internet:<URL: http://web.archive.org/web/20050209014751/http://laipac.com/multimedia-rear-mirror.htm>, Feb. 9, 2005.
ATC Chameleon. Techdad Review [Online] Jun. 19, 2013 [Retrieved on Dec. 30, 2015]. Retrieved from Internet. <URL:http://www.techdadreview.com/2013/06/19atc-chameleon/>.
"Breathalyzer." Wikipedia. Printed Date: Oct. 16, 2014; Date Page Last Modified: Sep. 14, 2014; <http://en.wikipedia.org/wiki/Breathalyzer>.
Dees, Tim; Taser Axon Flex: The next generation of body camera; <http://www.policeone.com/police-products/body-cameras/articles/527231- 0-TASER-Axon-Flex-The-next-generation-of-body-camera/, Date Posted: Mar. 12, 2012; Date Printed: Oct. 27, 2015.
Brown, TP-LINK TL-WDR3500 Wireless N600 Router Review, Mar. 6, 2011.
Controller Area Network (CAN) Overview, National Instruments White Paper, Aug. 1, 2014.
Daskam, Samuel W., Law Enforcement Armed Robbery Alarm System Utilizing Recorded Voice Addresses via Police Radio Channels, Source: Univ. of Ky, Off of Res and Eng., Serv (UKY BU107), pp. 18-22, 1975.
*Digital Ally* vs. *Taser International, Inc.*, Case No. 2:16-cv-232 (CJM/TJ); US D. Kan, Defendant Taser International Inc.'s Preliminary Invalidity Contentions, Jul. 5, 2016.
Electronic Times Article, published Feb. 24, 2005.
Supplementary European Search Report dated Sep. 28, 2010 in European Patent Application No. 06803645.8; Applicant: Digital Ally, Inc.
W. Fincham, Data Recorders for Accident Investigation, Monitoring of Driver and Vehicle Performance (Digest No. 1997/122), Publication Date: Apr. 10, 1997, pp. 6/1-6/3.
Frankel, Harry; Riter, Stephen, Bernat, Andrew, Automated Imaging System for Border Control, Source: University of Kentucky, Office of Engineering Services, (Bulletin) UKY BU, pp. 169-173, Aug. 1986.
Freudenrich, Craig, Ph.D.; "How Breathalyzers Work—Why Test?." HowStuffWorks. Printed Date: Oct. 16, 2014; Posted Date: Unknown; <http://electronics.howstuffworks.com/gadgets/automotive/breathalyzer1.htm>.

(56) References Cited

OTHER PUBLICATIONS

Hankyung Auto News Article, Know-How Bank's Black Box for Cars "Multi-Black Box," Copyright 2005.
Guide to Bluetooth Security: Recommendations of the National Institute of Standards and Technology, National Institute of Standards and Technology, U.S. Dep't of Commerce, NIST Special Publication 800-121, Revision 1 (Jun. 2012).
ICOP Extreme Wireless Mic, Operation Supplement, Copyright 2008.
ICOP Model 20/20-W Specifications; Enhanced Digital In-Car Video and Audio recording Systems, date: Unknown.
ICOP Mobile DVRS; ICOP Model 20/20-W & ICOP 20/20 Vision, date: Unknown.
Bertomen, Lindsey J., PoliceOne.com News; "Product Review: ICOP Model 20/20-W," May 19, 2009.
ICOP Raytheon JPS communications, Raytheon Model 20/20-W, Raytheon 20/20 Vision Digital In-Car Video Systems, date: Unknown.
Overview of the IEEE 802.15.4 standards for Low rate Wireless Personal Area Networks, 2010 7th International Symposium on Wireless Communication Systems (ISWCS), Copyright 2010.
Lewis, S.R., Future System Specifications for Traffic Enforcement Equipment, S.R. 1 Source: IEE Colloquium (Digest), N 252, Publication Date: Nov. 18, 1996, pp. 8/1-8/2.
Kopin Corporation; Home Page; Printed Date: Oct. 16, 2014; Posted Date: Unknown; <http://www.kopin.com>.
Translation of Korean Patent No. 10-1050897, published Jul. 20, 2011.
Lilliput RV 18-50NP 5" Rear View Mirror TFT LCD Screen with Camera, Retrieved from the Internet: <URL: http://www.case-mod.com/lilliput-rv1850np-rear-view-mirror-tft-lcd-screen-with-camera-p-1271.html>, Mar. 4, 2005.
Motor Magazine Article, Recreating the Scene of an Accident, published 2005.
New Rearview-Mirror-Based Camera Display Takes the Guesswork Out of Backing Up Retrieved from the Internet: <URL: httb://news.thomasnet.com/fullstory/497750>, Press Release, Oct. 30, 2006.
SIIF Award for Multi Black Box, published Dec. 10, 2004.
Near Field Communication; Sony Corporation; pp. 1-7, Date: Unknown.
Oregon Scientific ATC Chameleon Dual Lens HD Action Camera, http://www.oregonscientificstore.com/Oregon-Scientific-ATC-Chameleon-Dual-Lens-HD-Action-Camera.data, Date Posted: Unknown; Date Printed: Oct. 13, 2014, pp. 1-4.
Asian Wolf High Quality Angel Eye Body Video Spy Camera Recorder System, http://www.asianwolf.com/covert-bodycam-hq-angeleye.html, Sep. 26, 2013, Date Posted: Unknown, pp. 1-3.
Amazon.com wearable camcorders, http://www.amazon.com/s/ref=nb_sb_ss_i_0_4?url=search-alias%3Dphoto&field-keywords=wearable+camcorder&x=0&y=0&sprefix=wear, Sep. 26, 2013, Date Posted: Unknown, pp. 1-4.
Notification of Transmittal of the International Search Report and the Written Opinion of the International Searching Authority, or the Declaration dated Feb. 4, 2016; International Application No. PCT/US2015/056052; International Filing Date: Oct. 16, 2015; Applicant: Digital Ally, Inc.
http://www.k-h-b.com/board/board.php?board=products01&comand=body&no=1, Current State of Technology Held by the Company, Copyright 2005.
City of Pomona Request for Proposals for Mobile Video Recording System for Police Vehicles, dated prior to Apr. 4, 2013.
http://www.k-h-b.com/sub1_02.html, Copyright 2005.
Renstrom, Joell; "Tiny 3D Projectors Allow You to Transmit Holograms From a Cell Phone." Giant Freakin Robot. Printed Date: Oct. 16, 2014; Posted Date: Jun. 13, 2014; <http://www.giantfreakinrobot.com/sci/coming-3d-projectors-transmit-holograms-cell-phone.html>.
Request for Comment 1323 of the Internet Engineering Task Force, TCP Extensions for High Performance, Date: May 1992.
RevealMedia RS3-SX high definition video recorder, http://www.revealmedia.com/buy-t166/cameras/rs3-sx.aspx, Sep. 26, 2013, Date Posted: Unknown, pp. 1-2.
Scorpion Micro DV Video Audio Recorder, http://www.leacorp.com/scorpion-micro-dv-video-audio-recorder/, Sep. 26, 2013, Date Posted: Unknown, pp. 1-3.
"Stalker Press Room—Using In-Car Video, the Internet, and the Cloud to keep police officers safe is the subject of CopTrax live, free webinar." Stalker. Printed Date: Oct. 16, 2014; Posted Date: Jul. 31, 2014.
State of Utah Invitation to Bid State Cooperative Contract; Vendor: ICOP Digital, Inc., Contract No. MA503, Jul. 1, 2008.
Wasson, Brian; "Digital Eyewear for Law Enforcement." Printed Date: Oct. 16, 2014; Posted Date: Dec. 9, 2013; <http://www.wassom.com/digital-eyewear-for-law-enforcement.html>.
X26 Taser, Date Unknown.
Taser International; Taser X26 Specification Sheet, 2003.
Digital Ally First Vu Mountable Digital Camera Video Recorder, http://www.opticsplanet.com/digital-ally-first-vu-mountable-digital-carmera-video-recorder.html?gclid=CIKohcX05rkCFSlo7AodU0lA0g&ef_id=UjCGEAAAAWGEjrQF:20130925155534:s, Sep. 25, 2013, Date Posted: Unknown, pp. 1-4.
Drift X170, hftp://driftinnovation.com/support/firmware-update/x170/, Sep. 26, 2013, Date Posted: Unknown, p. 1.
European Patent Application 15850436.6 Search Report dated May 4, 2018.
Final Written Decision for Inter Partes Review No. 2017-00375, *Axon Enterprise Inc.* v. *Digital Ally, Inc.*, dated Jun. 1, 2018.

* cited by examiner

COMPREHENSIVE VIDEO COLLECTION AND STORAGE

RELATED APPLICATIONS

This non-provisional patent application claims priority benefit, with regard to all common subject matter, of commonly assigned U.S. Provisional Patent Application No. 62/291,744, filed Feb. 5, 2016, entitled "COMPREHENSIVE VIDEO COLLECTION AND STORAGE" and U.S. Provisional Patent Application No. 62/328,784, filed Apr. 28, 2016, entitled "COMPREHENSIVE VIDEO COLLECTION AND STORAGE." These provisional applications are hereby incorporated by reference in their entirety into the present application.

BACKGROUND

1. Field

Embodiments of the invention are broadly directed to video collection and storage. More specifically, embodiments of the invention are directed to the storage and collection of video data from body-wearable video cameras and camera docks.

2. Related Art

Many institutions, such as schools, hospitals, factories, and businesses, could benefit from equipping employees with body-wearable video cameras. These body-wearable video cameras are small enough to be unobtrusive while capturing the events experienced by the wearer. However, body-wearable video cameras of the prior art require a significant administrative and technical burden to implement. What is lacking in the prior art is an efficient and intelligent system to manage video collection and storage from body-wearable video cameras.

SUMMARY

Embodiments of the invention solve these problems by providing a video collection system that retains and selectively stores video data. The video collection system broadly comprises a plurality of body-wearable cameras, a plurality of camera docks for receiving and docking the plurality of body-wearable cameras, and a video collection manager. The plurality of camera docks is configured to interface with the plurality of body-wearable cameras, wherein each camera includes a camera-memory element. The camera docks also include a dock-memory element that is configured to receive and store video data from the camera-memory element. The video collection manager is communicatively coupled with one or both of the plurality of cameras and the plurality of camera docks. In some embodiments, the body-wearable video camera can be instructed or controlled by the video collection manager and can transmit captured video to a remote location, such as a memory associated with the video collection manager. In other embodiments, the captured video is transmitted or otherwise downloaded to the camera dock(s), and the video collection manager can instruct or otherwise control transmission of the captured video from the video camera dock and to the memory associated with the video collection manager.

A first embodiment of the invention is directed to a video collection system comprising a body-wearable video camera, a camera dock, and a video collection manager. The camera dock is configured to interface with the body-wearable video camera having a camera-memory element. The camera dock includes a dock-memory element configured to receive and store video data from the camera-memory element. The video collection manager is communicatively coupled with the camera dock. The camera dock sends at least a portion of the video data to the video collection manager.

A second embodiment of the invention is directed to a video collection system that includes a body-wearable video camera and a camera dock. The body-wearable video camera has a camera-memory element. The camera dock is configured to interface with the body-mounted video camera and includes a dock-memory element configured to receive and store video data from the camera-memory element, and a communication element configured to send a portion of the video data to a video collection manager. The video collection manager is remote from the camera dock.

A third embodiment of the invention is directed to a computerized method for selectively saving and transferring video data by a camera dock, the method comprising the following steps: acquiring an indication that a body-wearable video camera is communicatively coupled; receiving a set of metadata associated with a set of video data that is on the body-wearable video camera; analyzing the set of metadata to determine a subset of the set of video data to be transferred; instructing the body-wearable video camera to transfer the subset of video data; saving the subset of the video data to a dock-memory unit; selecting a sub-subset of the video data by analyzing the set of metadata and at least one criterion from a video collection manager; and transferring the sub-subset of the video data to the remote video collection manager.

Other embodiments of the invention may be directed to a video collection system that includes a body-wearable video camera, a camera dock, and a video collection manager. Still other embodiments of the invention may be directed to a video collection manager, a camera dock, or a body-wearable video camera. Still further embodiments of the invention may be directed to a computerized method for selectively saving and transferring video data by a body-wearable video camera, or a computerized method for selectively requesting and saving video data by a video collection manager. Yet still further embodiments of the invention may be directed to a non-transitory computer readable storage medium having a computer program thereon for performing at least one of the methods discussed herein. The computer program instructs a processing element to perform the steps of the method.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
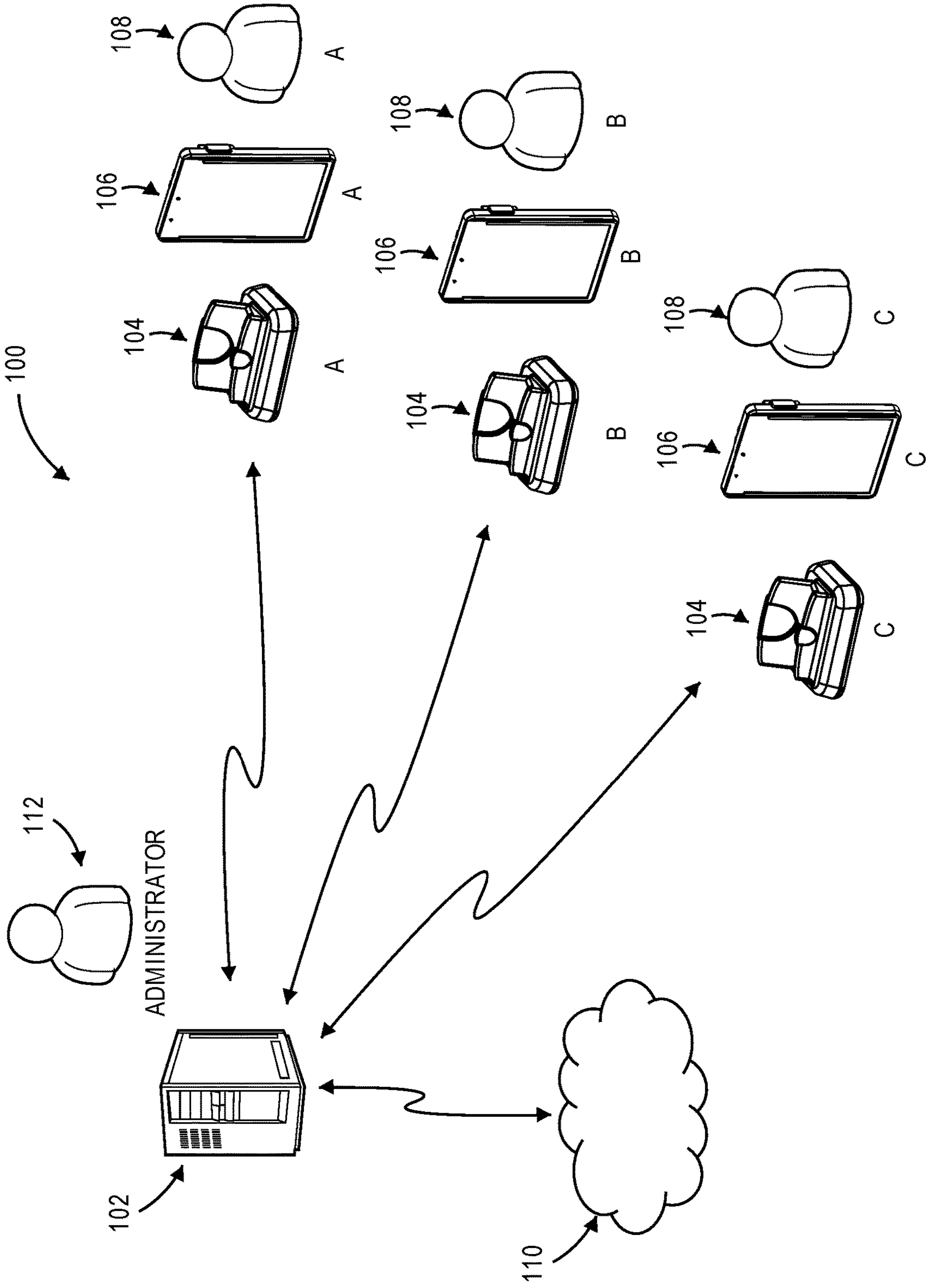
FIG. 1 is a system diagram illustrating various components of a video collection system.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

System and Environment

FIG. 1 illustrates an exemplary embodiment of the invention. A video collection system 100 of embodiments of the invention may comprise computing devices to facilitate the functions and features described herein. The computing devices may comprise any number and combination of processors, controllers, integrated circuits, programmable logic devices, or other data and signal processing devices for carrying out the functions described herein, and may additionally comprise one or more memory storage devices, transmitters, receivers, displays, and/or communication busses for communicating with the various devices of the video collection system 100.

Embodiments of the invention are directed to a video collection system 100 comprising a video collection manager 102, at least one camera dock 104, and at least one body-wearable video camera 106. FIG. 1 illustrates an exemplary implementation in which a single video collection manager 102 is utilized to collect video data from three body-wearable video cameras 106 (labeled A-C) via three camera docks 104 (correspondingly labeled A-C). Each of the video cameras is associated with a user 108 (correspondingly labeled A-C). For example, User A may utilize Video Camera A during a work day (or in another situation) and then place Video Camera A into Dock A at the end of the work day. Dock A will interact with the video collection manager 102 to transfer all, some, or none of the collected video data (as well as any associated metadata, as discussed below). The video collection manager 102 may then upload all, some, or none of the collected video data to a cloud-based storage system 110 or other long-term storage system. It should be noted that in some embodiments the video collection manager 102 is the cloud-based storage system 110.

In embodiments, the video collection manager 102 is a centralized or regional device or computer program. The video collection manager 102 communicates with the camera docks 104 and/or the body-wearable video cameras 106 to determine what video data should be saved, where it should be saved, and for how long it should be saved. The video collection manager 102 does so by setting various criteria for saving and deleting. The video collection manager 102 may have an associated administrator 112. The administrator 112 is a person, group of people, or other entity that controls or monitors the video collection system 100 (which may include one or more of the users 108). The administrator 112 may set the criteria for saving video data, request specific video data, review received video data, transfer video data, or perform other functions (such as those described herein) in furtherance of monitoring and controlling the video collection system 100. The administrator 112 may configure the video collection system 100 as desired based on the camera parameters (e.g., location of the body-wearable video camera 106), the user 108 (a first user's camera may be programmed differently than a second user's camera based on a desire to always record all data for the first user but not always record all data for the second user), or other factors.

In embodiments of the invention, multiple video cameras are associated with the video collection manager 102. Video cameras can be used to record events as seen from a first-person perspective of the user 108. This can be advantageous for recreating and demonstrating what happened at a later date. For example, if the user 108 observes a crime, an accident, or an event or function being performed, this can be observed later by others via the video. The video camera may be mounted, worn, secured, or otherwise associated with the user 108 as discussed below.

In embodiments of the invention, the body-wearable video camera 106 will record continuously throughout the work shift (or similar time period). The body-wearable video camera 106 may therefore begin recording so long as it is not in the camera dock 104. For example, the video camera may automatically begin recording upon being removed from the camera dock 104 and then cease recording upon being returned from the camera dock 104. This allows minimal interaction and requirements to the placed on the user 108. The body-wearable video camera 106 may contain enough battery life in a battery and enough memory in a camera-memory element 308 to record at least one day's worth of events (and may record much longer, such as 15 days as discussed below). The user 108 can utilize a "mark" button (illustrated in FIG. 3) on the body-wearable video camera 106 to denote important events or observations that may be worthy of later review and retention. The user 108 may also perform an audible tagging by saying a certain phrase that is interpreted as being a mark, such that the user 108 need not push a mark button. The audible tagging may also be automatic, such as by being triggered by very loud noises captured. In some embodiments, the mark button can trigger another camera in the classroom to begin recording. The video data captured by the body-wearable video camera 106 may be stored internally and/or transferred to the camera dock 104 as discussed below.

In embodiments of the invention, each body-wearable video camera 106 is assigned to a single user 108. This allows the administrator 112 and/or the video collection manager 102 to request video data associated with the user 108 by requesting specific information from the associated body-wearable video camera 106. In some embodiments, the labor associated with assigning each user 108 and chances for error are reduced by an automated process. For example, the body-wearable video camera 106 may include a unique code (such as a QR code) as each are distributed. All the user 108 has to do is scan the QR code with smartphone. The QR code takes them to a special website that asks for name, pull-down of school locations, and any other needed information. As the video collection system 100 knows the serial numbers associated with a customer, the assignment is automatically performed and less prone to error.

In embodiments of the invention, the captured and recorded data may be deleted in post processing based on a parameter associated with the recorded data or the capture of data may be temporarily paused based on a parameter associated with the body-wearable video camera 106. For example, in embodiments, the parameter may be a location of the body-wearable video camera 106 when the data was captured. In some instances, in may be undesirable to capture and/or record data when the user 108 is in a restroom. Therefore, embodiments of the invention may either pause the recording when the body-wearable video camera 106 detects it is in the restroom, or some or all of the data recorded while the user 108 was in the restroom may be deleted post processing. Alternatively, some data is not deleted, such as metadata or audio, but video data is deleted; for example, it may be desirable to record audio data and/or metadata even when the parameter is detected, but not to record video data.

Controlling and Monitoring the System

Controlling and monitoring embodiments of the video collection system 100 may be performed in various ways. A few exemplary structures and methods will be discussed. It should be appreciated that various embodiments of the invention could be applied to numerous fields. Two exemplary fields of use for the invention include schools and hospitals and will be discussed briefly such that the reader can get an appreciation for how embodiments of the invention may be utilized. Other embodiments could be directed to factories, commercial establishments, and other locations where fixed video cameras would provide an inadequate and incomplete record of events transpiring in the area. As yet another example, embodiments of the invention may be used in any building where video and/or audio surveillance is desirable, either for evidence collection or security purposes. In some embodiments, the cameras may not be body-wearable video cameras 106 but may instead be fixedly mounted in a building (either inside or outside), such as for a building-security system.

In the exemplary field of schools, teachers, coaches, and school administrators may be outfitted with body-wearable video cameras 106 that easily adhere to a clothing article worn by the user 108. Then, as the teacher (or other user 108) interacts with students throughout the day, the body-wearable video camera 106 silently and inconspicuously records the events experienced. The teacher would also be provided with a camera dock 104 in their classroom or office for charging the body-wearable video camera 106 and storing the video data. As most video data would be uneventful, the video data would be stored on the camera dock 104 as space permitted. This would allow the video data to be accessed within the certain time period if it becomes later evident that the video data may be important. For example, a crime may be committed in front of a teacher without that teacher realizing what happened. Upon later realization, the video data could be retroactively located and used to prosecute the crime.

Figure 2:
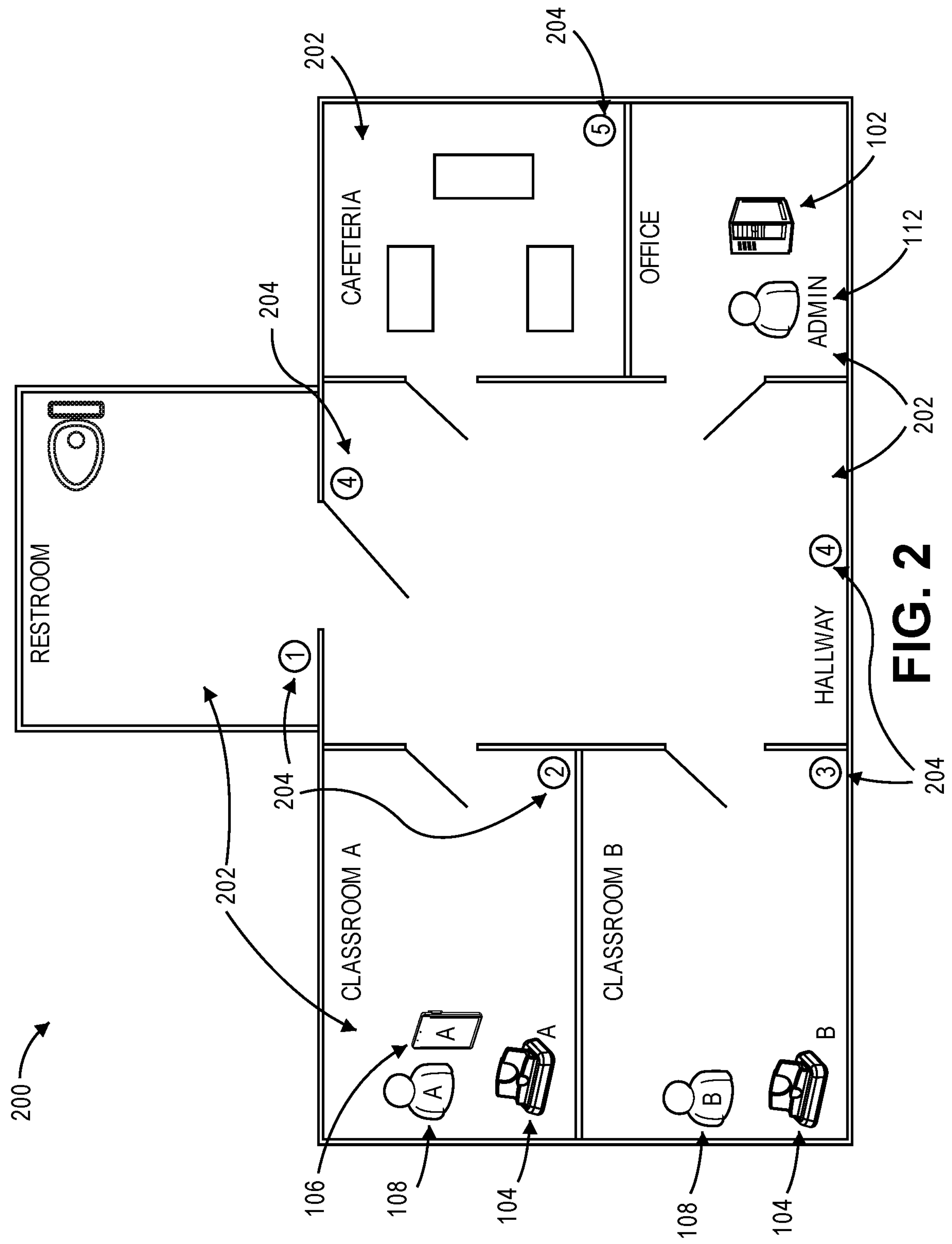
FIG. 2 is a simplified schematic of a school that implements an embodiment of the video collection system.

FIG. 2 illustrates an exemplary school 200 that is utilizing an embodiment of the invention. It should be appreciated that the illustrated exemplary school is presented so as to explain concepts to the reader that may be utilized in a school or in any other field of use or location for various embodiments of the invention. The illustrated school 200 has various rooms 202. The illustrated rooms 202 include a Restroom, a Classroom A, a Classroom B, a Hallway, a Cafeteria, and an Office. Each of these rooms 202 will be used to discuss a possible feature or setting that may be used in various embodiments of the invention.

These rooms 202 may include a beacon 204 or other structure to identify the current location of the body-wearable video camera 106. The beacon 204 is used to tell the body-wearable video camera 106 what room 202 the body-wearable video camera 106 (and by extension, the user 108 wearing or otherwise controlling the body-wearable video camera 106) is currently in or near. These beacons 204 may utilize Bluetooth technology, Wi-Fi technology, RFID technology, Infrared technology, or any other technology that may be utilized to inform the body-wearable video camera 106 of its current location. The beacons 204 are labeled in circles in FIG. 2 with corresponding numbers. The beacons 204 may each have a unique (or semi-unique) identifier that is communicated to the body-wearable video camera 106 either directly or indirectly. This information may be recorded in metadata for the video data, or otherwise indicated such that the room 202 or nearest beacon 204 can be identified later.

In embodiments of the invention, at least one beacon 204 may prevent the recording of video data in proximity thereto. For example, the Restroom may include a beacon 204 that instructs a cease of recording or an immediate deletion of recording upon docking. The video collection system 100 could have a sensor (such as the beacon 204) in a restroom to instruct the body-wearable video camera 106 to not record when in the restroom unless the mark button is pressed. The instruction not to record may be explicit in the received message (such as a digital instruction to cease recording) or may be understood by the body-wearable video camera 106 to cease recording based upon knowing that the certain beacon 204 (e.g., Beacon 1 as illustrated in FIG. 2) is associated with the restroom. Alternatively, upon receiving the video data, the camera dock 104 may automatically delete the video data that was collected from the restroom (either from the camera-memory unit or from the dock-memory unit) unless the video data also has an indication that the mark button was pressed. Similarly, the user 108 may override the cease recording instruction by pressing the mark button in the restroom. As another example, the sensor could instruct to only keep the audio from the body-wearable video camera 106, or to only keep the video from the body-wearable video camera 106.

In embodiments of the invention, at least one beacon 204 may induce conditional recording of video data in proximity thereto. For example, Classroom A and Classroom B may include user-specific beacons 204. User A may be a teacher in Classroom A but not in Classroom B. Beacon 2 (in Classroom A, as illustrated) may instruct Camera A to record, or Camera A may begin recording upon detecting Beacon 2. In this example, if User A is in Classroom B, Beacon 3 may instruct Camera A not to record, or Camera A may cease recording upon detecting Beacon 3. This is because User A is not otherwise associated with Classroom B, such that there is not a reason to record the interactions of User A with User B or other persons in Classroom B. Again, User A may override this function by pressing a mark button or providing another indication to record.

In embodiments of the invention, at least one beacon 204 may ensure the recording of video data in proximity thereto. Some beacons 204, such as those in the Hallway illustrated in FIG. 2, may be used to ensure that all body-wearable video cameras 106 are recording. Because certain events may be prevalent in these areas, the beacon 204 may ensure that all body-wearable video cameras 106 are instructed to record. Other examples of these locations may include meeting rooms, factory floors, or safe rooms.

It should be appreciated that in the above-discussed examples, preventing recording may be done by stopping the video-capture element 306 (or ensuring that the video-capture element 306 is not recording), automatically deleting the video data, marking the video data for deletion (such as by adding or editing metadata), preventing the transfer of video data, or by other steps that ensure the video data is not created, saved, or transferred. Similarly, it should be appreciated that in the above-discussed examples, ensuring recording may be done by starting the video-capture element 306 (or ensuring that it is already started), automatically transferring the video data, marking the video data for transfer (such as by adding or editing metadata), transferring the video data, or by other steps that ensure the video data is created, saved, and transferred.

In some embodiments of the invention, one or more beacon 204 is a component of a proximity tag system for authenticating the devices, cameras, docks, and beacons 204 associated with the video data. The proximity tag system comprises a plurality of proximity tags and at least one proximity tag reader. Proximity tags are any devices that radiate an identifying signal, herein referred to as the proximity tag identifier, that can be read by a corresponding reader such as the proximity tag reader. Proximity tags can be active (meaning that they periodically broadcast their identifier), assisted passive (meaning that they broadcast their identifier only when interrogated by a signal from the reader), or passive (meaning that they have no power source and must be illuminated by a signal from the proximity tag reader in order to radiate their identifier). Other forms of proximity tags are also possible. Proximity tag identifier may be preprogrammed into proximity tags, or may be field-programmable, such that the identifier is assigned by the user 108 when the proximity tag is deployed. One common form of proximity tag system is the radio-frequency identification (RFID) tag and the corresponding RFID reader. Another form of proximity tag system utilizes a challenge-response protocol to avoid the spoofing of a proximity tag identifier. Other forms of proximity tag systems can include Bluetooth technology.

The proximity tag reader receives the proximity tag identifiers transmitted by proximity tag. The proximity tag reader may be integrated into body-wearable video camera 106, and proximity tag identifiers are then communicated by communications element to the other components of the video collection system 100. In other embodiments, body-wearable video camera 106 may instead (or in addition) contain a proximity tag, which is read by another proximity tag reader located in another component of the video collection system 100 such as the camera dock 104, the beacon 204, and/or the video collection manager 102. Depending on the type of proximity tag, a different type of reader may be required to receive the proximity tag identifiers. For example, an active reader is required to read passive tags. In some embodiments, the proximity tag reader can determine the distance to the transmitting tag based on signal strength or other information. In some embodiments, multiple proximity tag readers are present. In some such implementations, positional information about the tag can be determined based on a relative signal strength at each reader.

Embodiments of the invention may also be useful for providing oversight on the teachers (or other users 108) without a significant administrative burden. This would allow school administrators or even concerned parents to review a brief, random clip of video data. For example, a ten-minute clip during classroom discussion may be uploaded daily or upon request. This may ease the burden of selectively recording for review purposes, disciplinary purposes, regulatory compliance purposes, and other purposes that would impose a periodic burden on the users 108. It should be noted that school administrators may be a system administrator 112, as illustrated in FIG. 1 and FIG. 2, but are not necessarily. The system administrator 112 may be unassociated with the school and may instead by associated with the cloud-based storage system 110 or other components of the video collection system 100.

Another exemplary embodiment for the invention is in hospitals. In these embodiments, doctors and other hospital personnel would wear a body camera in the hospital. Doctor interactions with the patients would be recorded. This will help provide concrete and credible evidence in medical malpractice cases. As such, the doctor would be able to prove what information was given to the patient, what responses were given by the patient, etc. This provides a video record of the interactions between doctor and patient. It should be appreciated that a hospital or other medical facility may include various beacons 204 that ensure or prevent the recording. For example, all video data may be capture while the body-wearable video camera 106 is in a patient's room. Further, the data may be tagged with an indication of patient information and/or room information. As such, all interactions with that patient may be recorded and be configured to be stored together or otherwise associated.

In embodiments of the invention, the body-wearable video camera 106 only begins recording in certain circumstances. The body-wearable video camera 106 may therefore rely on trigger features to begin recording. For example, the patient may be wearing an RFID tag. When the body-wearable video camera 106 comes into proximity with the RFID tag, video recording is triggered to begin. Similarly, when the doctor leaves the proximity of the patient the body-wearable video camera 106 may stop recording (or transfer to the next patient RFID tag). Metadata and/or video data may transferred to and stored with an electronic medical record of the patient. For example, certain metadata may indicate that the video data should be uploaded, such as location information in an operating room, or mark button presses indicative of substantive patient interactions.

Various information related to the video may be stored in metadata of the recorded video data from the body-wearable video camera 106 and/or the camera dock 104. Metadata associates one set of data with another set of data. The metadata may be embedded in the captured video data, stored externally in a separate file that is associated with the captured video data, otherwise associated with the captured video data, or all of the above. Embedding the beacon indication into the same file with the captured video data can be advantageous because it allows the metadata to travel as part of the data it describes. In some such embodiments, metadata is associated with a particular frame or frames of the video data. This is advantageous where, for example, the same video file contains more than one beacon indication as the user 108 moves around between areas. In other such embodiments, the metadata is associated with the video file as a whole. Externally stored metadata may also have advantages, such as ease of searching and indexing. The metadata may also be stored in a human-readable format, such that a user 108 can access, understand, and edit the metadata without any special software. For example, the metadata (either directly or in an easily readable format) may be presented to the administrator 112 so as to allow the administrator 112 to select various video files or sub-files for retrieval and retention.

Externally stored metadata may also be more easily and quickly transferred. In embodiments of the invention, as soon as the body-wearable video camera 106 is connected to the camera dock 104, the metadata for all or a portion of the video data is transferred first. The camera dock 104 and/or the video collection manager 102 may then make decisions on which video data to transfer, save, and delete based at least in part on the transferred metadata.

In embodiments of the invention, a triggering event may initiate the recording of video data. As a first example, a pressing of Code Blue button on other medical equipment may trigger recording. Upon the triggering of the Code Blue, the video collection manager 102 may instruct all body-wearable video cameras 106 on the floor or in the room to begin recording. In some of these embodiments, the video collection manager 102 may be in communication with the body-wearable video cameras 106 (such as via Wi-Fi, Bluetooth, or other wireless communication protocol). In other of these embodiments, the triggering of the Code Blue may power or otherwise initiate a beacon 204, or change the associated signal with at least one beacon 204.

As a second example, a triggering event may be tied to the deployment or removal of specific equipment or tools may initiate recording. A defibrillator being taken out of a holster may trigger the body-wearable video camera 106 to begin recording. Similarly, a crash cart being brought into a patient's room may have a beacon 204 therein which instructs all body-wearable video cameras 106 to begin recording. The beacon 204 may be located in proximity to the equipment or tool, such that a removal of the tool is detected by the beacon 204 and instructs the beacon 204 to begin recording. For example, the removal of the equipment may provide power to the beacon 204, complete a circuit associated with the beacon 204, allow for an infrared beam to be detected across a void that was previously occupied by the equipment, or otherwise be detected.

As yet another example, a washing station within the hospital may be equipped with a beacon 204. The beacon 204 would automatically trigger a recording and may tag which body-wearable video camera 106 is being used. The body-wearable video camera 106 being used may be checked against a schedule to ensure that the doctor is in the correct location for the procedure. The beacons 204 may therefore be used to track locations of the doctors, and other personnel, so that a record of what doctor was interacting with a patient can be better recorded.

In embodiments of the invention, patients that do not want to be recorded may be allowed to opt out of recording. This may be done in post-processing, such that a video may be subsequently destroyed if nothing of extraordinary is noted. In other embodiments, this may be done in pre-processing before the video is taken. For example, the patient may have an RFID tag to instruct the body-wearable video camera 106 not to record while in the presence of that RFID tag, or the beacon 204 associated with the patient's room may be altered to instruct no recording.

Still other fields of use may include factories, sales, military, sports, and other fields in which may meet any of certain commonalities. These commonalities could include extended periods of contact with a customer or other person. This may be useful for monitoring performance. Another commonality may be in high-risk litigation situations, in which retaining relevant video data can reduce liability. Yet another commonality are situations that include high performance, in which the video data may be retained for later review to help improve the performance.

Other examples of parameters associated with the body-wearable video camera 106 that may be used to determine recording, pausing, and/or post-proceeding deletion of recorded data include a time of day when the data is being recorded, the user 108 and privileges associated with the user 108, a memory capacity of a particular camera, a type of or location of the body-wearable video camera 106 (e.g., a head-mounted camera may be assigned different recording and processing features than a camera worn on a user's chest), etc.

In embodiments of the invention when the mark button is pressed, the body-wearable video camera 106 sends metadata and/or a still image to the video collection manager 102. This may be used to alert a security administrator 112 of the mark. For example, the metadata may include a location within the facility where the mark was pressed, the time of the press, the orientation of the body-wearable video camera 106 during the press, and other information related to the body-wearable video camera 106 or the image. In some embodiments, upon a press of the mark button the body-wearable video camera 106 may start live streaming the video data to the video collection manager 102 for immediate review (such as in an emergency situation). This may be done at the request of the security administrator 112 (e.g., a remotely given command via the video collection manager 102) or by an indication from the user 108 such as a long press, a series of multiple presses of the mark button, or by a certain audible mark.

In some embodiments of the invention, the video collection manager 102 (either automatically or by instruction from the administrator 112) may request certain video data before analyzing the metadata sent from the body-wearable video camera 106. Before the body-wearable video camera 106 is even plugged in to camera dock 104, an administrator 112 is interested in certain video for a user 108. So, the request is pushed to all or some of the camera docks 104. Additionally, or alternatively, the request could be placed in the video collection manager 102 or the cloud-based storage system 110. The user 108 may place their assigned body-wearable video camera 106 into any camera dock 104. As long as administrator 112 knows which camera it wants, the administrator 112 can send request from an administrator application. The user 108 does not have to drive to a particular camera dock 104. In some embodiments, the video collection system 100 may alert (such as via contact information, via an alert directly from the body-wearable video camera 106, or a general system alert) the user 108 and request that the user 108 go plug in to a camera dock 104. In some embodiments, the video collection system 100 may pull data directly from the body-wearable video camera 106 without having to dock into a camera dock 104. For example, the body-mountable video camera 106 may be equipped with Wi-Fi, which is power hungry, only to be utilized during these priority transfers.

Exemplary Hardware Components

Figure 3:
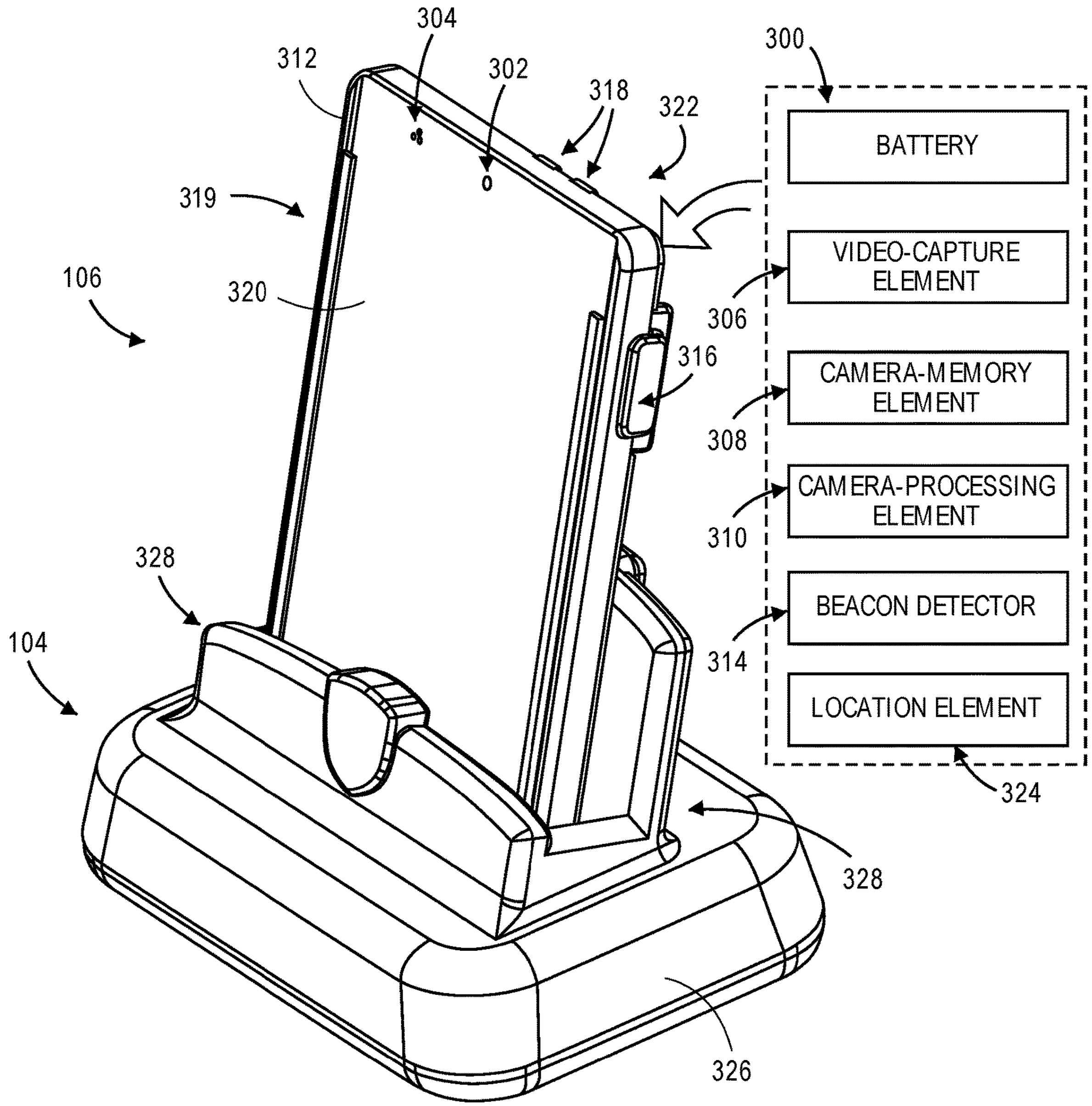
FIG. 3 is a perspective view of a body-wearable video camera docked into a camera dock.

An exemplary body-wearable video camera 106 and camera dock 104 is shown in FIG. 3. As can be seen, in embodiments of the invention, the body-wearable video camera 106 is configured to be placed into or onto the camera dock 104. The camera dock 104 may provide power to recharge a battery 300 of the body-wearable video camera 106 and direct file transfers of video data from the body-wearable video camera 106. The body-wearable video camera 106 is configured to be secured to the user 108 such that the video camera can record the various events which the user 108 is involved in or adjacent to. The body-wearable video camera 106 may take any of several forms. The illustrated body-wearable video camera 106 represents only an exemplary embodiment.

In the exemplary embodiment illustrated in FIG. 3, the body-wearable video camera 106 is shaped similarly to an identification badge and configured to be worn by the operator about a lanyard (not illustrated) or other securing device. The lanyard is easy for the operator to place onto their body and remove at the end of their shift. In some embodiments of the invention, the body-wearable video camera 106 is configured to be minimally noticeable to other persons that are not a user or otherwise associated with the video collection system 100. For example, the body-wearable video camera 106 may have additional markings, stickers, labels, card slots, or other structures or markings to make identification of the body-wearable video camera 106 less likely. This may prevent or reduce the likelihood that the external person (such a patient, student, customer, or other person) is aware that they are being recorded. The lanyard and the body-wearable video camera 106 may also be easy for the user 108 to put on at the beginning of the shift and easy to take off at the end of the shift. The lanyard may also allow the user 108 to place the body-wearable video camera 106 into the camera dock 104 without removing the lanyard (or other securing structure) therefrom.

In embodiments of the invention, the body-wearable video camera 106 comprises an optical lens 302, a microphone 304, a video-capture element 306, a camera-memory element 308, the battery 300, a camera-processing element 310, and a housing 312. The optical lens 302 is associated with the video-capture element 306 to direct light toward the video capture element 306. The optical lens 302 may refract or reflect some of the light, or the optical lens 302 may allow the light to simply pass therethrough. The video-capture element 306 creates a digital recording indicative of the light that was received and captured by the optical lens 302. The digital recording is stored in the camera-memory element 308. The camera-memory element 308 may be a removable memory (such as an SD card) or a permanent memory (such as internal ROM, internal RAM, or a non-transitory computer readable medium). The body-wearable video camera 106 may further include a beacon detector 314 that is configured to detect, either passively or actively, the beacons 204 via at least one wireless technology. The body-wearable video camera 106 may further include the above-discussed mark button 316. The body-wearable video camera 106 may further include at least one indicator light 318 configured to provide status information to the user 108.

In some embodiments of the invention, such as those in which the body-wearable video camera 106 is configured to look like an identification badge as discussed above, the housing 312 is generally a rounded rectangular prism. The housing 312 comprises a main body 319 that presents a front plate 320 and a back plate 322. As illustrated, the transition between the front plate 320 and the back plate 322 may be rounded or arcuate. The rounded or arcuate transitions provide comfort to a person holding the body-wearable video camera 106. The main body 319 of the housing 312 could also be another shape, such as substantially a cylinder, substantially an oval cylinder, substantially an ellipsoid, or substantially a sphere.

Embodiments of the body-wearable video camera 106 may further comprise a location element 324, such as a global positioning systems ("GPS") receiver. The location element 324 determines and records the GPS location of the body-wearable video camera 106 during at least a portion of the video collection. The location element 324 transmits information indicative of the location to the camera-processing element 310. The location information may then be stored on the memory element of the body wearable video camera and/or be transmitted to the camera dock 104 and/or video collection manager 102. The location element 324 may also determine and record the time associated with the video data. This information can be further saved as video metadata, as described above. The location information and time information provide further authentication to the video data. For example, the video collection manager 102 may request all video data from within a certain range of a geographic coordinate or within a certain area. Based upon the metadata of the video data, the camera dock 104 may transfer only the video data that meets the criteria to the video collection manager 102.

In embodiments of the invention, the body-wearable video camera 106 is configured to interface with the camera dock 104. The camera dock 104 provides power to recharge the battery 300 of the body-wearable video camera 106. The camera dock 104 may hold the body-wearable video camera 106 when not in use, or provide a cable to be attached to the body-wearable video camera 106. The camera dock 104 also communicatively couples with the body-wearable video camera 106. As such, the video data on the body-wearable video camera 106 may be selectively transferred to and stored on a dock-memory element 412. In other embodiments, the camera dock 104 may be a cable that is connected to a computing device.

Figure 4A:
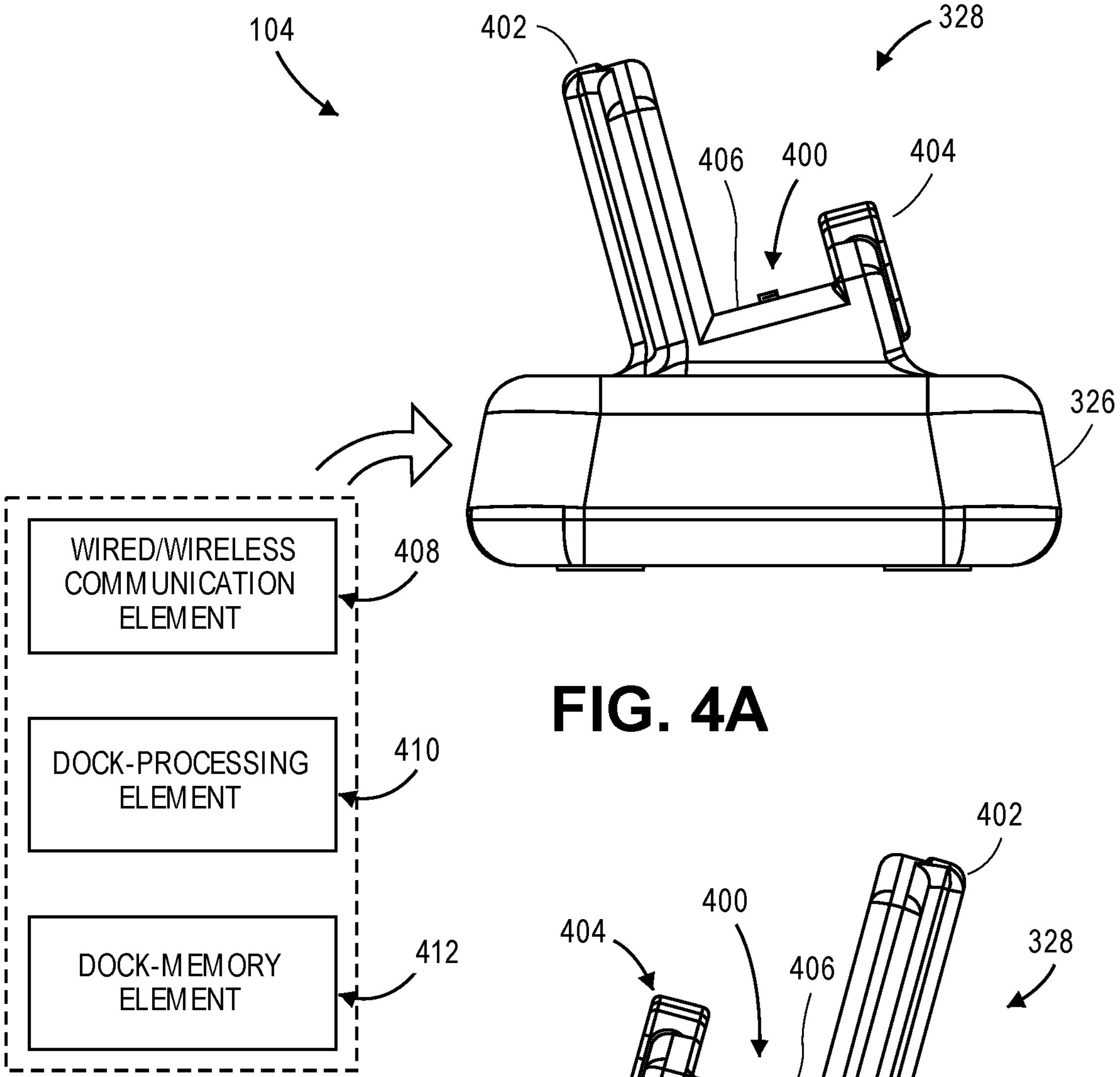
FIGS. 4A and 4B illustrate a right and a left side, respectively, of the camera dock of FIG. 3.
Figure 4B:
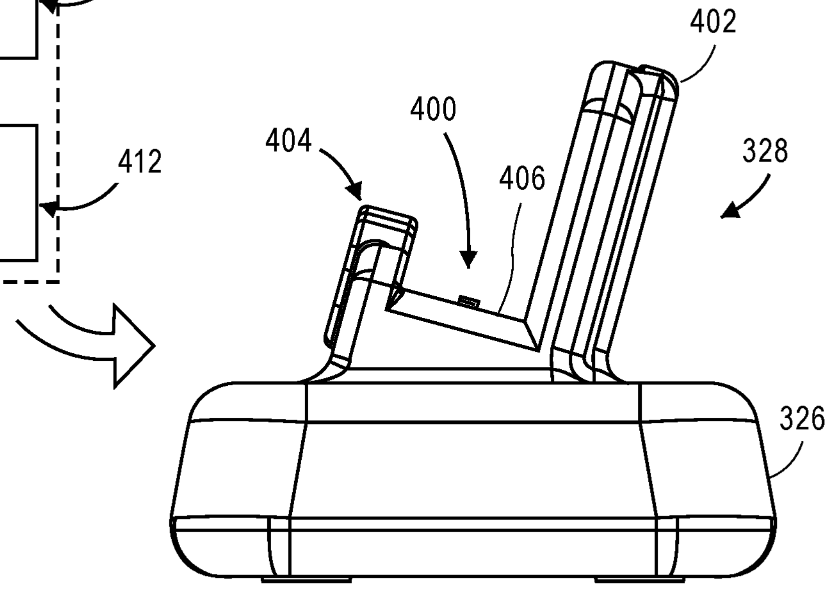

In embodiments of the invention, the camera dock 104 includes a base 326 and a camera rest 328, as best illustrated in FIGS. 4A and 4B. The base 326 is configured to be placed against the ground or other surface. The camera rest 328 is configured to support the body-wearable video camera 106 therein while keeping the camera securely in contact with an electrical contact 400. The camera rest 328 may include a rear protrusion 402 and a front protrusion 404. The rear protrusion 402 and the front protrusion 404 both extend vertically from the base 326. The rear protrusion 402 provides a surface against which the camera can rest, while the front protrusion 404 prevents the body-wearable video camera 106 from tipping backward over the rear protrusion 402. In embodiments of the invention, the camera rest 328 may further include at least one side protrusion 406 for aligning the body-wearable video camera 106 to the electrical contact 400 on the camera dock 104 aligned with a complementary set of receptors (not illustrated) on the body-wearable video camera 106. In some embodiments, the camera rest 328 may include one or more magnets for retaining the body-wearable video camera 106 in the desired location and orientation relative to the camera rest 328

The dock may further include ports for power and digital communications, not illustrated. In some embodiments, the camera dock 104 may further include a wireless communication element 408 for communicating with the video collection manager 102 and/or the body-wearable video camera 106. In some embodiments, the video collection system 100 may include hardwired docks and wireless docks. The hardwired docks may be utilized when a large data transfer is requested, and may be centrally located (such as in the office of FIG. 2). The wireless docks may be distributed to various rooms 202 for normal use when a large file transfer is not anticipated by the user 108.

The camera dock 104 may further include a dock-processing element 410 that may perform the below discussed steps for selectively downloading and uploading the video data. The dock-processing element 410 therefore acts as an intelligent gateway, preventing and allowing various data to pass therethrough. The intelligent gateway therefore reduces the administrative and digital burden of transferring large video files for storage to the cloud-based storage system 110. By deciding which files to leave on the body-wearable video camera 106, which files to delete, which files to transfer to the camera dock 104, which files to save on the camera dock 104, and which files to transfer to the video collection manager 102, the dock-processing element 410 can significantly reduce the amount of data that is transferred over the network. The dock-processing element 410 reduces the burden on the network while not significantly reducing the needed video data that is ultimately stored.

In other embodiments, the camera dock 104 does not include a dock-processing element 410 and acts as a passive gateway. The passive gateway allows the camera to dock and provides a conduit for information flow from the body-wearable video camera 106 to the video collection manager 102. In some of these embodiments, the camera dock 104 has no dock-memory unit 412. In these embodiments, the dock is a mechanical cradle with the electrical contact 400. The body-wearable video camera 106 sits cradled in the camera dock 104 while an external power supply (not illustrated) is plugged into the camera dock 104, and an external USB-to-Ethernet adapter is plugged into the camera dock 104. There may be no or few electronics in the camera dock 104. The body-wearable video camera 106 will communicate directly (such as via Ethernet or Wi-Fi) with the video collection manager 102. Therefore, in embodiments of the invention, at least a portion of the discussed steps as performed by the camera dock 104 may instead performed by the body-wearable video camera 106 and/or the video collection manager 102.

In embodiments of the invention, the video collection system 100 includes a set of camera docks 104, each associated with one or more body-wearable video cameras 106. Each camera dock 104 includes the dock-memory element 412 configured to receive and store video data from the camera-memory element 308 for at least one body-wearable video camera 106. For example, each user 108 may have a camera dock 104 for their body-wearable video camera 106. The camera dock 104 may also receive metadata related to the video data, such as timestamps, location stamps, user information, video camera information, mark data, and the like.

Operation of the Camera Dock

In embodiments of the invention, the camera dock 104 keeps the video data local to the body-wearable video camera 106 and the camera dock 104 unless otherwise requested or needed. The camera-memory element 308, such as an internal SD Card or the like, stores the video data throughout the day (and as space permits). Either or both of the body-wearable video camera 106 or the camera dock 104 includes a circular buffer, commonly known as a "first in, first out" (or FIFO) buffer. The FIFO buffer may be one day, one week, two weeks, one month, two months, or longer. Other types of buffers may also be employed. The circular buffer may also use an intelligent FIFO buffer, in which unmarked video data is deleted before marked video data (as the marked video data is more likely to present important information). As can be appreciated, an amount of captured data (whether video data, audio data, or metadata) available to be recorded is dependent on the memory size, the video frame rate, the video resolution, the video quality, the video bit rate, etc. In some circumstances, it may be desirable for one or both of the body-wearable video camera 106 and camera dock 104 to include a buffer. In some embodiments, the buffer for the body-wearable video camera 106 may be shorter than the buffer for the camera dock 104, such that the buffer for the body-wearable video camera 106 records a lesser amount of data before overwriting than the camera dock 104's buffer. For example, the buffer for the body-wearable video camera 106 may by an 8-hour or one-week buffer, whereas the buffer for the camera dock 104 may be a one-week or one-month buffer. In alternative embodiments, the camera dock 104 buffer may record a lesser amount of data than the video camera 106 buffer.

In some embodiments, the body-wearable video camera 106 will utilize a reduced video resolution, video frame rate, video quality, and/or video bit rate. These reduced video parameters may be set by the video collection manager 102, by the camera dock 104, or internally by the body-wearable video camera 106 based upon the frequency of dockings, available memory, available battery life, whether the mark button has been pressed, and other considerations. Based upon the reduced rates, the camera dock 104 may then be able to store locally (e.g., on the dock-memory element 412) until or if the video collection manager 102 requests the metadata or the video data. The camera dock 104 may also automatically and selectively erase older video data. For example, video data that does not include mark button press, trigger, or sensor information may be deleted first as the likelihood of importance of that video data is reduced.

For example, if the video frame rate is 30 fps, the video resolution is 720p (1280×720), and the video quality is high, the video bit rate may be 4 mbps. At 4 mbps, a 32 GB memory can store 18 hours of video data. As another example, if the video frame rate is 10 fps, the video resolution is D1 (720×480), and the video quality is low, the video bit rate may be 0.2 mbps. At 0.2 mbps, a 32 GB memory can store 364 hours of video data (which is over 15 days). It should therefore be appreciated that the video collection system 100 may record, store, and/or transcode (discussed below) the video data to achieve a storage of the maximum amount of video data for the storage available. It should also be appreciated that the above are merely examples, and the actual video parameters may be different.

In yet other embodiments, metadata may be transmitted to the remote location, dock, or memory associated with the video collection manager 102 on a periodic, regular basis, such as at the end of each workday or shift. The video and/or audio data may continue to be stored on the body-wearable video camera 106 and in keeping with the FIFO buffer. The metadata may then undergo an analysis to identify any notable events or information that would prompt a need for uploading the video and/or audio data from the body-wearable video camera 106. For example, if the metadata shows the mark button was actuated, the video and/or audio data may be automatically uploaded to the video collection manager 102. As another example, for cameras equipped with or associated with a GPS (e.g., a GPS in a mobile device carried by the user 108 wearing the body camera or a GPS included with the body-wearable video camera 106) for documenting the location of the body-wearable video camera 106, if the GPS metadata shows the body-wearable video camera 106 was taken outside of a pre-set geofence, the video and/or audio data may be automatically uploaded to the video collection manager 102.

In embodiments of the invention, the body-wearable video camera 106 may upload only certain information or types of information, such as metadata, when the body-wearable video camera 106 is within range or proximity of an access point (e.g., a wireless camera dock). For example, if the body-wearable video camera 106 is employed in a fleet vehicle, such as an ambulance or delivery service, the metadata may be uploaded at the end of each workday when the ambulance or delivery service is returned to the fire-house, hospital, central work site, etc. where there is a wireless access point. In other embodiments, the metadata may include various tags, such as time of day, location of the body-wearable video camera 106 while recording (discussed above), automatic event triggering (discussed above), etc. In some situations, the administrator 112 may desire to upload any recorded data associated with a particular type of tag. For example, in law enforcement applications, a video camera worn by an officer may include a tag for whether a traffic stop is for a DUI versus speeding versus expired tags, etc. Depending on the type of traffic stop indicated by the officer at a central control element in the vehicle, the recorded video captured by the officer's body-wearable video camera 106 will include a particular tag. Consequently, depending on the type of tag, the video may be automatically and immediately uploaded to the remote location or the memory associated with the video collection manager 102. In addition, any type of data may be uploaded manually to the remote location or the memory associated with the video collection manager 102 on demand and at the request of the administrator 112.

In both automatic and manual uploading, only a portion of the recorded data may be uploaded, referred to as data segmentation. The administrator 112 may choose to upload only a portion or segment of the data. The user 108 may selectively choose to upload video data, audio data, and/or metadata, and may further choose to upload such selected data for a pre-set time period. Alternatively, the recorded data may be automatically uploaded based on a triggering event. As discussed herein, a triggering event could include manual actuation of the mark button on the body-wearable video camera 106, a location of the body-wearable video camera 106, a speed of the body-wearable video camera 106 (e.g., if an accelerometer or location element 324 with the body-wearable video camera 106 indicates the user 108 is running), etc.

In data segmentation, a portion of the captured and recorded data (whether it be video data, audio data, or metadata) is segmented from the original corresponding data based on the triggering event time (e.g., actuating the mark button), a pre-set prerecording time (e.g., 30 second, one minute, two minutes, or five minutes), and a pre-set post-recording time (e.g., 30 second, one minute, two minutes, five minutes, ten minutes, or twenty minutes). The data segmentation is achieved by identifying the start and stop times corresponding to the pre-set prerecording time and the pre-set post-recording time, parsing the raw video, audio, or metadata from the original, longer recording and corresponding to the start and stop times, and extracting and repackaging the video, audio, or metadata into a new, shorter recording. This video segmentation may be performed by either or both of the body-worn camera or the camera dock 104. Thus, in embodiments where the metadata of actuating the mark button, for example, causes automatic uploading of the associated video and audio data, then the video collection system 100 may only automatically upload a pre-set time before and after the mark button was actuated, as opposed to uploading all recorded data and/or all recorded data for the particular workday. This is advantageous in situations where it is time consuming to upload the data due to wireless access or transmission speeds.

For example, if a particular 15 minutes is desired, prior art systems would transfer the entire file that contains those 15 minutes. Embodiments of the invention, instead of transferring a large file (such as a 2 gigabyte file that has 8 hours of video data), the segmentation happens at the camera dock 104. The segmentation is performed to minimize upload data and reduce the strain on the network. The segmentation may be performed with any of various programs, such as FFmpeg for video manipulation, transcoding, or segmentation. In prior art systems, the restriction in the devices is the processing power. Usually, the processor is not robust enough to do to perform these functions, so the large files are transferred for processing. Thus, embodiments of the invention utilize the camera dock 104 to perform these functions locally to the docked body-wearable video camera 106. This segmentation may produce a subset of video data, and/or a sub-subset of video data that is transferred between the various components of the video collection system 100.

The Video Collection Manager

In embodiments of the invention, the video collection manager 102 is a dedicated device that communicates with the camera docks 104. In other embodiments, the video collection manager 102 is a remote application operating on a server (such as a cloud-based video collection manager 102). In still other embodiments, the video collection manager 102 is a local application operating on a computer system associated with the facility or organization that administers the video collection system 100 (such as a laptop computer, desktop computer, smartphone, or tablet computer).

The video collection manager 102 is communicatively coupled with the camera dock 104. The video collection manager 102 may be communicatively coupled to the camera dock 104 directly or indirectly. Examples of direct communication include a wired or wireless connection between the video collection manager 102 and the camera dock 104. Indirect connection includes an intermediary device for facilitating the communication. For example, the camera dock 104 may be communicatively coupled to a computer, which in turn communicates with the video collection manager 102. As another example, the camera dock 104 may include a Wi-Fi connection that connects through a wireless router to the video collection manager 102, or a mobile broadband connection.

In embodiments of the invention, the camera dock 104 sends at least a portion of the video data to the video collection manager 102. The camera dock 104 will upload only the metadata unless certain conditions are met. If the conditions are met, the camera dock 104 will upload the video data associated with that metadata. These conditions may be previously determined or set by the video collection manager 102 (or a user 108 operating the video collection manager 102 or associated computer platform). The metadata may trigger an instance where want to upload the video. For example, metadata that may trigger an upload include a long press of the mark button, any press of the mark button, a GPS location, or entry into an unauthorized or abnormal location. As an example, a human operator or automatic process of the video collection manager 102 may manage the available upload bandwidth to prioritize the upload of certain information based upon the above-discussed characteristics. Based upon the number of body-wearable video cameras 106 in the camera docks 104, and the amount of video data to potentially be uploaded, the video collection manager 102 may direct what video data will be uploaded and an order for upload, what video data should be retained on the local body-wearable video camera 106 and/or camera dock 104, what video data should be deleted, etc. The priorities may be ordered, such that the highest priority information is sent first (such as metadata), and then other priority information is sent following (such as segmentations that indicate the mark button was pressed, or that meet other criteria set by the administrator 112 and/or the video collection manager 102), and non-prioritized information may be sent last or not at all (depending on the load on the network and the above-discussed criteria).

As discussed above, the camera docks 104 charge batteries 300, store data, and upload data. When the camera is docked, the camera dock 104 will pull or request metadata from the body-wearable video camera 106. The metadata may then be sent to a cloud-based or remote server (such as the video collection manager 102) so that the metadata can be searched, stored, and analyzed. Because the user 108 docks the body-wearable video camera 106 at the end of every shift, uploaded metadata (such as time stamps, serial numbers, who recorded, mark button presses, and the like) can be analyzed to determine what (if any) video data should be uploaded and stored in long-term storage at the cloud-based storage system 110 or other computing system. Other video data that is not uploaded may be stored locally on the camera dock 104 for a certain period of time (such as one week) or until space requirements necessitate deletion. Therefore, the video collection system 100 is only transferring the video that is recommended for review or retention. For example, if it is desired to watch a video from two days ago that was not uploaded, the video collection manager 102 may request that the specific video data to be uploaded and displayed to a user 108.

In some embodiments, the video collection manager 102 is also communicatively coupled with the body-wearable video cameras 106. The video collection manager 102 may pre-request that video be uploaded straight from the body-wearable video camera 106 wirelessly in significant event situations. The video collection manager 102 may also request an upload of the metadata thus far collected during operation, or to upload the metadata remotely such as if the user 108 forgot to dock the body-wearable video camera 106 after the previous shift.

In some embodiments of the invention, the video data is transcoded by the camera dock 104, the video collection manager 102, or both. For example, after the video data is transferred from the body-wearable video camera 106 to the camera dock 104, the camera dock 104 may transcode the original video into another format that is smaller in size. As another example, after the video is transferred from the camera dock 104 to the video collection manager 102, the video collection manager 102 transcodes the original video into another video smaller in size. The reduction in the video "size" can be achieved by reducing the video frame, video resolution, video quality, and/or other video parameter during the transcoding process. The video data is transcoded to save the storage space required. This allows the video data to be preserved for a longer period of time.

The timing and breadth of the transcoding is based on a retention policy, which may include one or more criterion established by the administrator 112 and/or the video collection manager 102. As one example, for the first three months, the recordings in the video collection system 100 remain unchanged. After 3 months, the video files are transcoded into smaller files. After another 12 months, the smaller files will be deleted. As another example, the video data may be transcoded based upon the content. Video data that is marked as important may retained at full size while other video data is transcoded to a smaller size. This retains potentially important video data while allowing less important data to be reduced in size and/or deleted.

Figure 5:
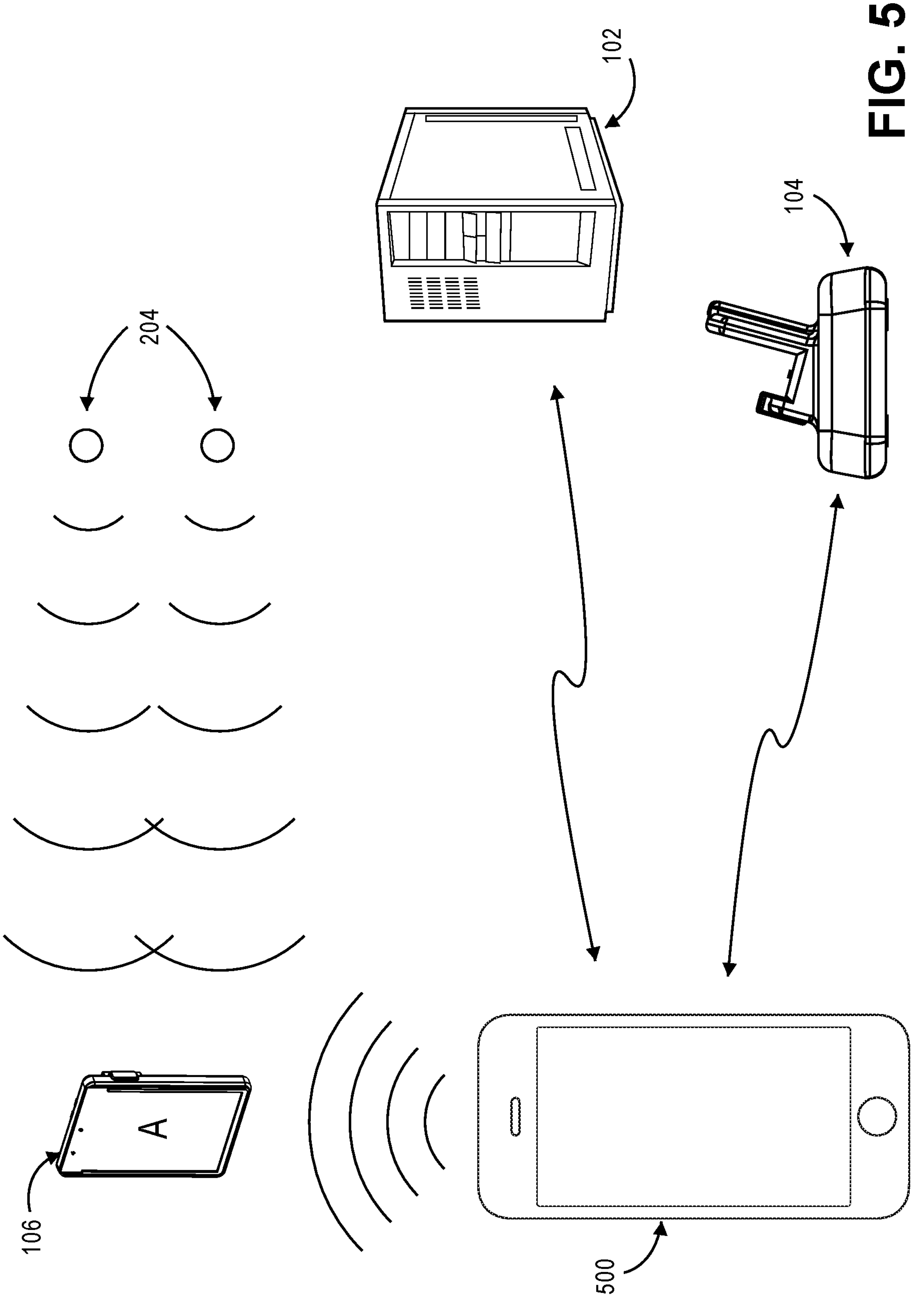
FIG. 5 is a system diagram illustrating a smartphone interacting with the components of the video collection system.

Embodiments of the invention may be advantageous for capturing events related to the school that take place where they may not have static cameras, such as field trips, playgrounds, athletic facilities, and outside of buildings. In some embodiments, the body-wearable video camera 106 may access and utilize a smartphone to transfer data while outside communication range with the video collection manager 102 and/or the communication dock. As illustrated in FIG. 5, the body-wearable video camera 106 may be communicatively coupled with the smartphone 500. The smartphone 500 may be communicatively coupled with the camera dock 104 and/or the video collection manager 102. The smartphone 500 may therefore be able to send information the camera dock 104 and/or the video collection manager 102 such as at least a portion of the metadata associated with the video data being collected, location information based upon a location element (such as a GPS) associated with the smartphone, beacon indication as detected by the body-wearable video camera 106 (and/or the smartphone 500) from at least one beacon 204, indications of a mark or other emergency indication, and other information so as to allow the smartphone to remain in contact and provide necessary information on the status.

Exemplary Procedures

Various methods of embodiments of the invention will now be discussed. A non-transitory computer readable storage medium having a computer program stored thereon may instruct the at least one processing element to implement the steps of at least one of the described methods. The non-transitory computer readable storage medium may be located within the housing 312 of the body-wearable video camera 106, within the camera dock 104, within the video collection manager 102, within a user device, within the at least one external camera, and/or within a generic computing device.

Figure 6:
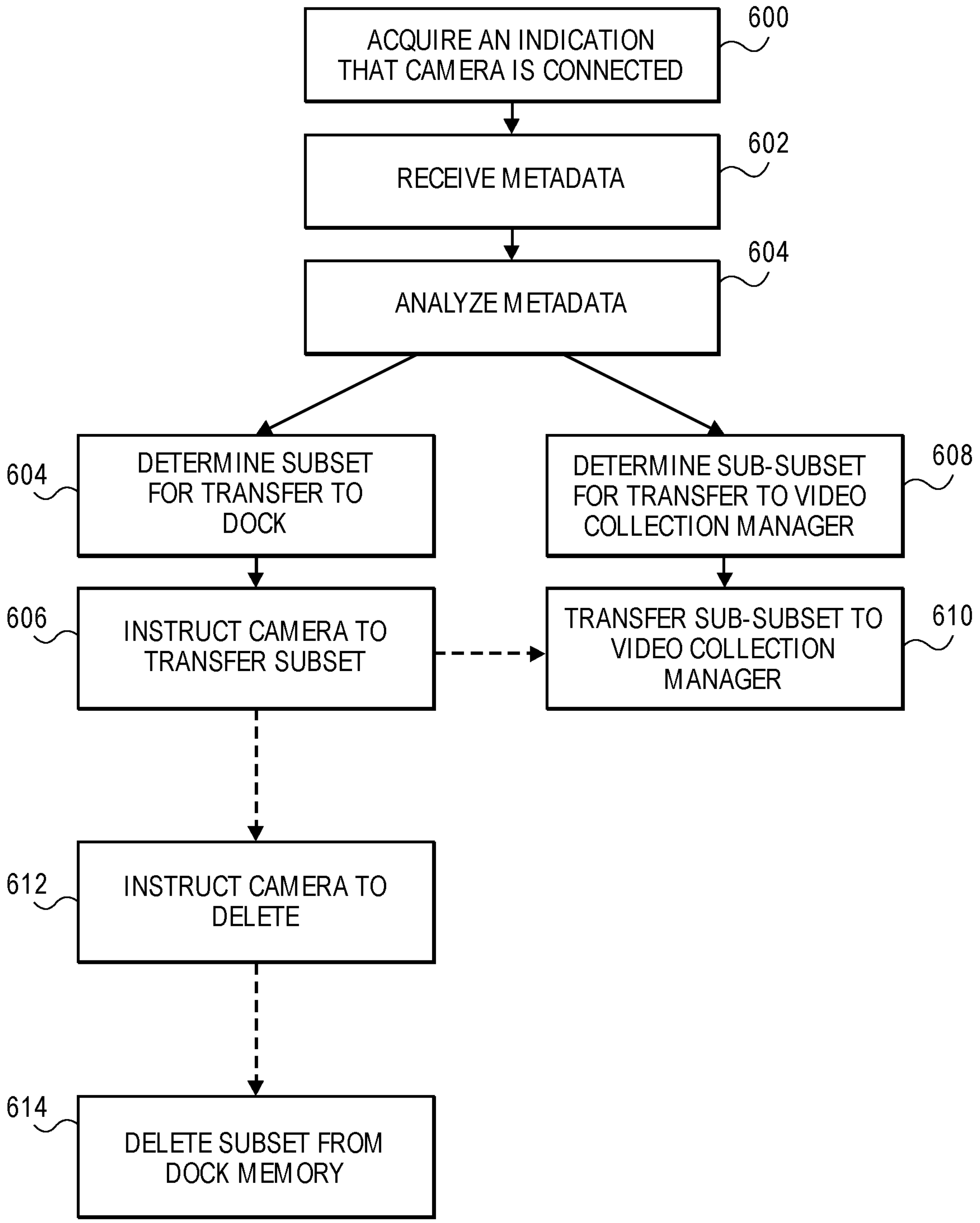
FIG. 6 is a flow diagram illustrating exemplary steps as performed by the camera dock.
Figure 7:
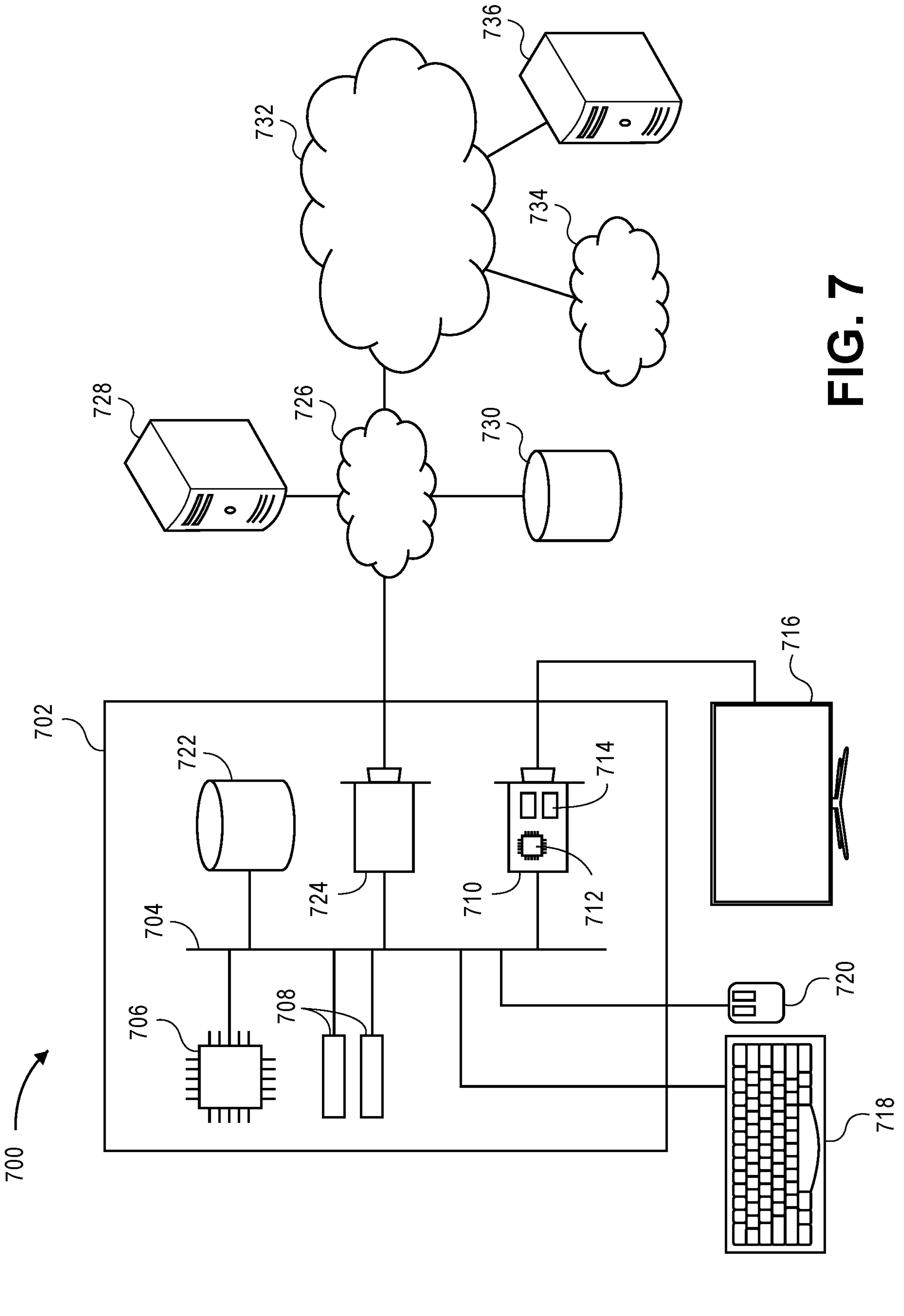
FIG. 7 is a system hardware diagram illustrating exemplary hardware components of the various computer systems.

Some embodiments of the invention are directed to a computerized method as performed by the dock-processing element 410, as illustrated in FIG. 6. A computerized method for selectively saving and transferring video data by a camera dock 104, the method comprising the following steps: acquiring an indication that a body-wearable video camera 106 is communicatively coupled (Step 600); receiving a set of metadata associated with a set of video data that is on the body-wearable video camera 106 (Step 602); analyzing the set of metadata to determine a subset of the set of video data to be transferred (Step 604); instructing the body-wearable video camera 106 to transfer the subset of video data; saving the subset of the video data to a dock-memory unit (Step 606); selecting a sub-subset of the video data by analyzing the set of metadata and at least one criterion from a video collection manager 102 (Step 608); and transferring the sub-subset of the video data to the remote video collection manager 102 (Step 610). As discussed above, the criterion may include one or more of a beacon indication, a mark indication, a location indication, and/or a time indication. In some embodiments, the method may further comprise the steps of instructing the body-wearable video camera 106 to delete the set of video data that is on the body-wearable video camera 106 (Step 612); and deleting the subset of video data that is saved to the dock-memory unit via a first in, first out buffer (Step 614). As discussed above, the first in, first out buffer may be applied considering the set of metadata such that video data more likely to be later requested from the video collection manager 102 is saved longer than other video data.

Exemplary Computer Hardware

The system 700 comprising an exemplary hardware platform that can form one element of certain embodiments of the invention is depicted. Computer 702 can be a desktop computer, a laptop computer, a server computer, a mobile device such as a smartphone or tablet, or any other form factor of general- or special-purpose computing device. Depicted with computer 702 are several components, for illustrative purposes. In some embodiments, certain components may be arranged differently or absent. Additional components may also be present. Included in computer 702 is system bus 704, whereby other components of computer 702 can communicate with each other. In certain embodiments, there may be multiple busses or components may communicate with each other directly. Connected to system bus 704 is central processing unit (CPU) 706. Also attached to system bus 704 are one or more random-access memory (RAM) modules 708.

Also attached to system bus 704 is graphics card 710. In some embodiments, graphics card 710 may not be a physically separate card, but rather may be integrated into the motherboard or the CPU 706. In some embodiments, graphics card 710 has a separate graphics-processing unit (GPU) 712, which can be used for graphics processing or for general purpose computing (GPGPU). Also on graphics card 710 is GPU memory 714. Connected (directly or indirectly) to graphics card 710 is display 716 for user interaction. In some embodiments no display is present, while in others it is integrated into computer 702. Similarly, peripherals such as keyboard 718 and mouse 720 are connected to system bus 704. Like display 716, these peripherals may be integrated into computer 702 or absent. Also connected to system bus 704 is local storage 722, which may be any form of computer-readable media, and may be internally installed in computer 702 or externally and removably attached.

Finally, network interface card (NIC) 724 is also attached to system bus 704 and allows computer 702 to communicate over a network such as network 726. NIC 724 can be any form of network interface known in the art, such as Ethernet, ATM, fiber, Bluetooth, or Wi-Fi (i.e., the IEEE 802.11 family of standards). NIC 724 connects computer 702 to local network 726, which may also include one or more other computers, such as computer 728, and network storage, such as data store 730. Local network 726 is in turn connected to Internet 732, which connects many networks such as local network 726, remote network 734 or directly attached computers such as computer 736. In some embodiments, computer 702 can itself be directly connected to Internet 732.

The computer program of embodiments of the invention comprises a plurality of code segments executable by a computing device for performing the steps of various methods of the invention. The steps of the method may be performed in the order discussed, or they may be performed in a different order, unless otherwise expressly stated. Furthermore, some steps may be performed concurrently as opposed to sequentially. Also, some steps may be optional. The computer program may also execute additional steps not described herein. The computer program, system 100, and method of embodiments of the invention may be implemented in hardware, software, firmware, or combinations thereof, which broadly comprises server devices, computing devices, and a communications network.

The computer program of embodiments of the invention may be responsive to user input. As defined herein user input may be received from a variety of computing devices including but not limited to the following: desktops, laptops, calculators, telephones, smartphones, smart watches, in-car computers, camera systems, or tablets. The computing devices may receive user input from a variety of sources including but not limited to the following: keyboards, keypads, mice, trackpads, trackballs, pen-input devices, printers, scanners, facsimile, touchscreens, network transmissions, verbal/vocal commands, gestures, button presses or the like.

The server devices and computing devices may include any device, component, or equipment with a processing element and associated memory elements. The processing element may implement operating systems, and may be capable of executing the computer program, which is also generally known as instructions, commands, software code, executables, applications ("apps"), and the like. The processing element may include processors, microprocessors, microcontrollers, field programmable gate arrays, and the like, or combinations thereof. The memory elements may be capable of storing or retaining the computer program and may also store data, typically binary data, including text, databases, graphics, audio, video, combinations thereof, and the like. The memory elements may also be known as a "computer-readable storage medium" and may include random access memory (RAM), read only memory (ROM), flash drive memory, floppy disks, hard disk drives, optical storage media such as compact discs (CDs or CDROMs), digital video disc (DVD), and the like, or combinations thereof. In addition to these memory elements, the server devices may further include file stores comprising a plurality of hard disk drives, network attached storage, or a separate storage network.

The computing devices may specifically include mobile communication devices (including wireless devices), work stations, desktop computers, laptop computers, palmtop computers, tablet computers, portable digital assistants (PDA), smartphones, and the like, or combinations thereof. Various embodiments of the computing device may also include voice communication devices, such as cell phones and/or smartphones. In preferred embodiments, the computing device will have an electronic display operable to display visual graphics, images, text, etc. In certain embodiments, the computer program facilitates interaction and communication through a graphical user interface (GUI) that is displayed via the electronic display. The GUI enables the user 108 to interact with the electronic display by touching or pointing at display areas to provide information to the video collection system 100.

The communications network may be wired or wireless and may include servers, routers, switches, wireless receivers and transmitters, and the like, as well as electrically conductive cables or optical cables. The communications network may also include local, metro, or wide area networks, as well as the Internet, or other cloud networks. Furthermore, the communications network may include cellular or mobile phone networks, as well as landline phone networks, public switched telephone networks, fiber optic networks, or the like.

The computer program may run on computing devices or, alternatively, may run on one or more server devices. In certain embodiments of the invention, the computer program may be embodied in a stand-alone computer program (i.e., an "app") downloaded on a user's computing device or in a web-accessible program that is accessible by the user's computing device via the communications network. As used herein, the stand-alone computer program or web-accessible program provides users 108 with access to an electronic resource from which the users 108 can interact with various embodiments of the invention.

Execution of the computer program of embodiments of the invention performs steps of the method of embodiments of the invention. Because multiple users 108 may be updating information stored, displayed, and acted upon by the computer program, information displayed by the computer program is displayed in real-time. "Real-time" as defined herein is when the processing element of the video collection system 100 performs the steps less than every 1 second, every 500 milliseconds, every 100 milliseconds, or every 16 milliseconds.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A computerized method of video collection and storage by a system comprising an active camera dock, a body-wearable video camera, and a remote video collection manager, the method comprising the following steps:

acquiring, by the camera dock, an indication that the body-wearable video camera is communicatively coupled to the camera dock;

acquiring, by the camera dock and from the body-wearable video camera, a set of metadata associated with video data that is saved on a camera memory element of the body-wearable video camera;

determining, by the camera dock, a subset of video data to be transferred to the camera dock based at least in part on the set of metadata;

instructing, by the camera dock, the body-wearable video camera to transfer only the subset of video data, wherein other video data not selected as part of the subset remains untransferred on the video camera;

saving, by the camera dock, the subset of the video data to a dock-memory unit;

selecting, by the camera dock, a sub-subset of the video data from the subset of video data;

transferring the sub-subset of the video data to the remote video collection manager, wherein other video data not selected as part of the sub-subset remains untransferred on the camera dock; and automatically transferring the video data to the camera dock and/or to the remote video collection manager or automatically deleting the video data from the camera dock based on at least one selection from a first set of metadata, wherein the first set of metadata includes a beacon indication, an audible-triggered mark indication, a location indication, and a speed indication.

2. The computerized method of claim 1, further comprising the following step:

instructing, by the camera dock, the video camera to transfer said set of metadata upon detecting that the video camera is communicatively coupled to the camera dock.

3. The computerized method of claim 1, further comprising the following steps:

instructing, by the camera dock, the video camera to delete the video data that is on the video camera; and deleting, by the camera dock, the subset of video data that is saved to the dock-memory unit via a first in, first out buffer.

4. The computerized method of claim 1, further comprising the following step:

automatically transferring video data associated with the first set of metadata when the first set of metadata includes: a location that is outside a predefined geographic area, a mark indication that was automatically triggered by an audible trigger, or a speed of the video camera that is indicative of a user running.

5. The computerized method of claim 1, further comprising the following step:

automatically deleting video data associated with the first set of metadata when the first set of metadata includes a location associated with a restroom.

6. A video collection system comprising: a video camera, a camera dock, and a remote video collection manager, said video camera including— a camera-memory element configured to record video data and save an associated set of metadata;

a camera-processor element configured to— send the set of metadata to the camera dock, receive a request for a subset of video data from the camera dock, and transfer said subset of video data to the camera dock as requested, wherein other video data not selected as part of the subset remains untransferred on the video camera; and said camera dock including— a dock-memory element;

a dock-processor element configured to— analyze the set of metadata to determine the subset of video data to be transferred based upon the set of metadata, request said subset of video data, store said subset of video data in the dock-memory element, determine a sub-subset of the video data from the subset of video data, and send the sub-subset of video data to the remote video collection manager, wherein other video data not selected as part of the sub-subset remains untransferred on the camera dock, wherein the set of metadata includes a beacon indication, an audible-triggered mark indication, a location indication, and a speed indication, and wherein the dock processor element is configured to automatically transfer video data to the camera dock and/or to the remote video collection manager, or automatically delete video data from the video camera and/or the camera dock based on at least one selection from the set of metadata.

7. The video collection system of claim 6, wherein the dock-processor element is further configured to instruct the camera to transfer said set of metadata upon detecting that the video camera is communicatively coupled to the camera dock.

8. The video collection system of claim 6, wherein the video camera further includes:

a housing that is configured to appear as an identity badge such that an observer is less likely to determine that the housing includes the video camera, wherein the housing is configured to be worn by a user via a lanyard;

an accelerometer; and a beacon sensor configured to detect a beacon and store a set of beacon information in metadata associated with the video data.

9. The video collection system of claim 6, wherein the dock-processor element is further configured to:

instruct the video camera to delete the video data that is on the video camera; and delete the subset of video data that is saved to the dock-memory element via a first in, first out buffer.

10. The video collection system of claim 6, wherein the dock processor element is configured to automatically transfer video data associated with the set of metadata when the set of metadata includes a location that is outside a predefined geographic area.

11. The video collection system of claim 6, wherein the dock processor element is configured to automatically transfer video data associated with the set of metadata when the set of metadata includes a speed of the video camera that is indicative of a user running.

12. The video collection system of claim 6, wherein the dock processor element is configured to automatically transfer video data associated with the set of metadata when the set of metadata includes a mark indication that was automatically triggered by an audible trigger.

13. The video collection system of claim 6, wherein the dock processor element is configured to automatically delete video data associated with the set of metadata when the set of metadata includes a location associated with a restroom.

14. The video collection system of claim 6, wherein the video camera is configured to initiate recording or to cease recording based on the proximity of the video camera to an RFID tag or a beacon.

15. A video collection system comprising: a camera dock and a video collection manager, said camera dock including— a dock-memory element configured to receive and store video data from a video camera, and a dock-processor element configured to— request, from the video camera, a subset of video data and an associated set of metadata that is stored on the video camera, wherein other video data not selected as part of the subset remains untransferred on the video camera;

store the subset of video data in the dock-memory element; and send the set of metadata to the video collection manager; and said video collection manager communicatively coupled with the camera dock, including a manager processor element configured to— receive said set of metadata indicative of the subset of video data that is stored in the dock-memory element;

analyze the set of metadata to determine a sub-subset of the subset of video data to be transferred based upon the set of metadata;

request, from the camera dock, the sub-subset of the subset of video data; and receive said sub-subset of the video data from the camera dock, wherein other video data not selected as part of the sub-subset remains untransferred on the camera dock wherein the set of metadata includes a beacon indication, an audible-triggered mark indication, a location indication, and a speed indication, and wherein the dock processor element is configured to automatically transfer video data to the video collection manager, or automatically delete video data from the camera dock based on at least one selection from the set of metadata.

16. The video collection system of claim 15, wherein the camera dock is communicatively coupled to the video collection manager via a wireless communication protocol, and wherein the camera dock is remote from the video collection manager.

17. The video collection system of claim 15, wherein the camera dock is communicatively coupled to the video collection manager via a wired communication protocol, and wherein the camera dock is remote from the video collection manager.

18. The video collection system of claim 15, wherein the dock-processor element is configured to:

receive the set of metadata upon detecting that the video camera is communicatively coupled to the camera dock.

19. The video collection system of claim 15, wherein the dock processor element is configured to automatically transfer video data associated with the set of metadata when the set of metadata includes: a location that is outside a predefined geographic area, a mark indication that was automatically triggered by an audible trigger, or a speed of the video camera that is indicative of a user running.

20. The video collection system of claim 15, wherein the dock processor element is configured to automatically delete video data associated with the set of metadata when the set of metadata includes a location associated with a restroom.

* * * * *